United States Patent
Kimura

(10) Patent No.: US 10,773,730 B2
(45) Date of Patent: Sep. 15, 2020

(54) VEHICLE SYSTEM AND VEHICLE

(71) Applicant: Toyota Jidosha Kabushiki Kaisha, Toyota-shi Aichi-ken (JP)

(72) Inventor: Kenji Kimura, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 344 days.

(21) Appl. No.: 15/800,806

(22) Filed: Nov. 1, 2017

(65) Prior Publication Data
US 2018/0141570 A1 May 24, 2018

(30) Foreign Application Priority Data
Nov. 18, 2016 (JP) ................................. 2016-225084

(51) Int. Cl.
*B60W 50/14* (2020.01)
*B60W 40/08* (2012.01)
*B60W 50/16* (2020.01)

(52) U.S. Cl.
CPC ............ *B60W 50/14* (2013.01); *B60W 40/08* (2013.01); *B60W 50/16* (2013.01); *B60K 2370/334* (2019.05); *B60W 2040/0827* (2013.01); *B60W 2050/143* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 5,488,353 A | * | 1/1996 | Kawakami | G08B 21/06 340/576 |
| 5,769,085 A | * | 6/1998 | Kawakami | A61B 5/024 600/519 |
| 2005/0030184 A1 | * | 2/2005 | Victor | B60K 28/06 340/576 |
| 2014/0309864 A1 | * | 10/2014 | Ricci | A61B 5/0077 701/36 |
| 2016/0068103 A1 | * | 3/2016 | McNew | B60Q 9/00 701/23 |
| 2017/0240109 A1 | | 8/2017 | Kimura | |
| 2017/0369075 A1 | * | 12/2017 | Hwang | B60K 28/066 |

FOREIGN PATENT DOCUMENTS

| | | |
|---|---|---|
| JP | 2012-050690 A | 3/2012 |
| JP | 2015-138383 A | 7/2015 |
| JP | 2017-151637 A | 8/2017 |

* cited by examiner

*Primary Examiner* — Tuan C To
*Assistant Examiner* — Kelly D Williams
(74) *Attorney, Agent, or Firm* — Dinsmore & Shohl LLP

(57) ABSTRACT

A vehicle system includes a warning device and at least one electronic control unit. The at least one electronic control unit is configured to present a light stimulus to a driver, and determine whether the driver is facing forward, determine whether the driver holds a steering wheel, and cause the warning device to perform a first warning when it is determined that the driver is not facing forward while the light stimulus is being presented. The first warning is either the vibration or the sound. The at least one electronic control unit is configured to perform a second warning when it is determined that the driver does not hold the steering wheel before a predetermined time elapses after the first warning is started. The second warning includes the vibration and the sound.

12 Claims, 17 Drawing Sheets

VEHICLE SYSTEM AND VEHICLE

CROSS-REFERENCE TO RELATED APPLICATIONS

This application claims priority to Japanese Patent Application No. 2016-225084 filed on Nov. 18, 2016, which is incorporated herein by reference in its entirety.

BACKGROUND

1. Technical Field

The present disclosure relates to a vehicle system and a vehicle.

2. Description of Related Art

Japanese Patent Application Publication No. 2015-138383 (JP 2015-138383 A) describes a device that includes a head-up display using the windshield in front of a driver. This device blinks the two positions that are spaced equally to the left and to right of the position in front of the driver and are within the driver's peripheral visual range. In this way, the device keeps the driver awake.

SUMMARY

However, when the wakefulness level of a driver is reduced to some extent or when the driver relies on autonomous driving so much that the driver's interest in driving is reduced, there is a possibility that the driver cannot respond, or feels troublesome to react, to a light stimulus. The device described in Japanese Unexamined Patent Application Publication No. 2015-138383, if is used for such a driver, does not produce a great effect, sometimes resulting in a reduced speed of driver's response to a change in the traffic environment.

The present disclosure provides a vehicle system and a vehicle that can encourage a driver to pay attention to driving according to the state of the driver.

A first aspect of the disclosure provides a vehicle system. The vehicle system according to the first aspect includes: at least one of a vibration generation device configured to generate a vibration and a sound output device configured to output a sound, and a display projection device configured to project a display on a display area of a head-up display provided in a vehicle. The at least one electronic control unit configured to present a light stimulus to a driver of the vehicle by using the head-up display when a change in a traffic environment is detected ahead of the vehicle, while the vehicle is performing autonomous driving, determine whether the driver is lacing forward, determine whether the driver holds a steering wheel, and cause the warning device to perform a first warning, when it is determined that the driver is not facing forward while the light stimulus is being presented, and perform a second warning, when it is determined that the driver does not hold the steering wheel before a first predetermined time elapses after the first warning is started. The first warning is either the vibration generated by the vibration generation device or the sound output by the sound output device. The second warning includes the vibration generated by the vibration generation device and the sound output by the sound output device.

According to the above aspect, this vehicle system enables the driver who is aware of driving to pay attention ahead. Moreover, the above aspect allows the vehicle system to give a stimulus also to a non-visual sense of the driver who is not facing forward while a light stimulus is being presented, thus encouraging the driver to face forward. In addition, this vehicle system can give the second warning, which is stronger than the first warning, to a driver whose wakefulness level is further reduced or to a driver who relies on autonomous driving so much that the interest in driving is further reduced. In this way this vehicle system can encourage the driver to pay attention to driving according to the state of the driver.

In the first aspect of the disclosure, the at least one electronic control unit may be configured to increment the number of re-holding times, when it is determined that the driver faces forward before a second predetermined time elapses after the second warning is started or when it is determined that the driver holds the steering wheel before the second predetermined time elapses after the second warning is started, and output a signal for terminating the autonomous driving of the vehicle to an autonomous driving electronic control unit, when the number of re-holding times while the light stimulus is being presented, is equal to or greater than a threshold. The autonomous driving electronic control unit may be provided in the vehicle and may be configured to perform the autonomous driving of the vehicle.

There is a tendency that a driver is overconfident in autonomous driving if the number of times the driver re-holds the steering wheel in response to the second warning is equal to or greater than the threshold. Such a driver tends to engage in a task ether than driving and have no intention to pay attention to driving. According to the above aspect, if there is a tendency that the driver has no intention to pay attention to driving, this vehicle system can terminate the autonomous driving of the vehicle to force the driver to drive the vehicle himself or herself.

In the first aspect of the disclosure, the at least one electronic control unit may be configured to decelerate the vehicle or stop the vehicle when it is determined that the driver does not hold the steering wheel before the second predetermined time elapses after the second warning is started.

If a driver does not re-hold the steering wheel in response to the second warning, there is a possibility that wakefulness level of the driver is extremely low. According to the above aspect, this vehicle system can decelerate or stop the vehicle to ensure traveling safety.

In the first aspect of the disclosure, the at least one electronic control unit may be configured to decelerate the vehicle or to stop the vehicle when it is determined that the driver does not hold the steering wheel before a second predetermined time elapses after the second warning is started.

According to the above aspect, this vehicle system can decelerate or stop the vehicle to ensure traveling safety.

In the first aspect of the disclosure, the vehicle system may include a driver monitor camera. The first determination unit may be configured to detect whether the driver is facing forward by using the driver monitor camera.

In the first aspect of the disclosure, the second warning may have a stimulus intensity higher than the stimulus intensity of the first warning, or excite more senses of the driver than the first warning.

A second aspect of the disclosure provides A vehicle. The vehicle according to the second aspect includes: a sensor configured to detect a change in a traffic environment ahead of the vehicle; a head-up display including & display projection device, the display projection device being configured to present a light stimulus to a driver of the vehicle by projecting a display on a display area of the head-up display based on a detection result of the sensor; a warning device configured to output at least one of a vibration and a sound; and at least one electronic control unit configured to cause the display projection device to present the light stimulus, determine whether the driver is facing forward, cause the warning device to perform a first warning when it is determined that the driver is not facing forward while the light stimulus is being presented, and determine whether the driver holds a steering wheel and, when it is determined that the driver does not hold the steering wheel before a first predetermined time elapses after the first warning is started, cause the warning device to perform a second warning. The second warning has a stimulus intensity higher than the stimulus intensity of the first warning, or excites more senses of the driver than the first warning.

In the second aspect of the disclosure, the vehicle system may include an autonomous, driving electronic control unit configured to perform autonomous driving of the vehicle. The at least one electronic control unit may be configured to cause the autonomous driving electronic control unit to perform the autonomous driving of the vehicle, increment the number of re-holding times when it is determined that the driver faces forward before a second predetermined time elapses after the second warning is started or when it is determined that the driver holds the steering wheel before the second predetermined time elapses after the second warning is started, and output a signal for terminating the autonomous driving of the vehicle to the autonomous driving electronic control unit when the number of re-holding times is equal to or greater than a threshold.

In the second aspect of the disclosure, the at least one electronic control unit may be configured to decelerate the vehicle or to stop the vehicle when it is determined that the driver does not hold the steering wheel before a second predetermined time elapses after the second warning is started.

According to one aspect and the embodiments of the present disclosure, the vehicle system and a vehicle that can encourage a driver to pay attention to driving according to the state of the driver is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
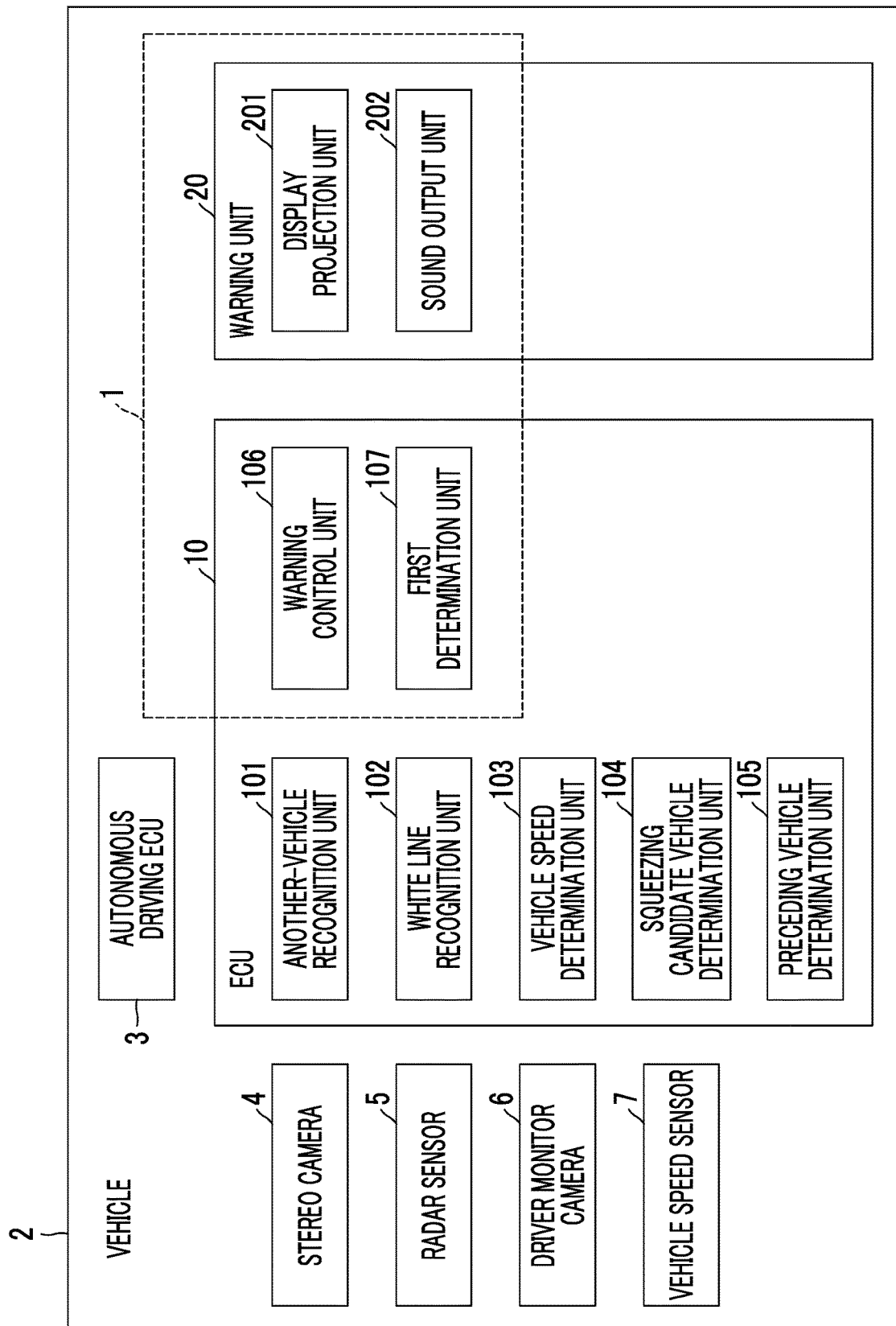
FIG. 1 is a functional block diagram of a vehicle including a vehicle system according to a first embodiment.

Embodiments will be described in detail below with reference to the drawings. In the description below, the same reference numeral is used for the same or equivalent component and the duplicated description is omitted.

First Embodiment

[Outline of Vehicle System 1]

FIG. 1 is a functional block diagram of a vehicle 2 including a vehicle system 1 according to a first embodiment. The vehicle system 1 is mounted on the vehicle 2 such as a passenger car. The vehicle 2 is a vehicle capable of autonomous driving. Autonomous driving refers to vehicle control in which the vehicle 2 is autonomously driven along a target route that is set in advance. During autonomous driving, the vehicle 2 travels autonomously with no need for the driver to perform the driving operation. The target route is a route on the map on which the vehicle 2 will travel in the autonomous driving mode.

The vehicle system 1 presents a light stimulus to the driver of the vehicle 2 using the head-up display of the vehicle 2 when a change in the traffic environment is detected ahead of the vehicle 2 during autonomous driving. The traffic environment includes the traveling situation of the vehicles around the vehicle 2, the signal lighting situation, the road condition, and so on. A change in the traffic environment means a change in the traffic environment from the traffic environment at a reference time. A change in the traffic environment is detected, for example, when there is a change: to the extent that the driver is required to pay attention. A specific example of a change in the traffic environment is that the preceding vehicle has decelerated its speed at a rate higher than the threshold speed or that another vehicle has squeezed into the space ahead of the vehicle 2.

The driver's driving awareness (consciousness or interest concerning the driving of the vehicle) may decrease during autonomous driving. For example, since the driver's driving operation is not required during autonomous driving, the wakefulness level of the driver tends to reduce more easily during autonomous driving than during manual operation. In addition, during autonomous driving, the driver may make a call by a mobile phone, watch the side scenery, play a game on a mobile terminal, or read a book. In other words, during autonomous driving, the driver may be engaged in a task other than driving.

The vehicle system 1 projects a display on the windshield of the vehicle 2 to give a fight stimulus to the driver for reducing a decline in driving awareness. A light stimulus is a visual stimulus, for example, a blinking display. A light stimulus also has au effect on the driver's peripheral visual field. For this reason, a light stimulus functions effectively not only for a driver whose face is oriented to the front direction but whose wakefulness level is reducing but also for a driver who is looking aside. A light stimulus, if presented to a driver who is aware of driving, allows the driver to improve the reduced wakefulness level or to turn the face toward the front to try to recognize the traffic environment. In addition, to prevent the driver from feeling annoying by excessive light stimulus presentation, the vehicle system 1 terminates the light stimulus presentation when the driver faces the front or when the driver turns the face toward the front in response to the light stimulus. That is, when the driver's face is orientated to the front while a light stimulus is being presented, the vehicle system 1 terminates the light stimulus presentation assuming that a driver is able to respond appropriately.

On the other hand, when the driver does not turn the face toward the front in response to a light stimulus, the vehicle system 1 determines that the driver's wakefulness level has reduced to such an extent that the driver cannot respond appropriately to an environmental change or determines that the driver relies on autonomous driving so much that he or she is engaged in another task. In this case, a light stimulus is not so effective and, therefore, the vehicle system 1 stimulates a sense other than a visual sense depending on the state of such a driver to help the driver to pay attention to driving. That is, the vehicle system 1 gives an appropriate stimulus according to the state pf the driver to encourage the driver to pay attention to driving.

[Configuration of Vehicle System 1]

As shown in FIG. 1, the vehicle 2 includes an autonomous driving ECU 3 (an example of an autonomous driving control unit), a stereo camera 4, a radar sensor 5, a driver monitor camera 6, a vehicle speed sensor 7, an Electronic Control Unit (ECU) 10, and a warning unit 20.

The autonomous driving ECU 3 is an electronic control unit having a computing unit such as a Central Processing Unit (CPU), storage units such as a Read Only Memory (ROM) and a Random Access Memory (RAM), and a Controller Area Network (CAN) communication circuit. The function of the autonomous driving ECU 3, which will be described later, is realized when the CPU of the autonomous driving ECU 3 loads a program, stored in the storage device, and executes the loaded program.

The autonomous driving ECU 3 performs autonomous driving. The autonomous driving ECU 3 is connected to a map database (not shown) that stores map information, a positioning unit (not shown) that determines the position of the vehicle 2 on the map by the Global Positioning System (GPS), various sensors (not shown) that detect the traveling state of the vehicle 2, and various actuators (not shown) that cause the vehicle 2 to travel.

The map information stored in the map database includes information on the position of a road (position information for each lane), information on the shape of a road (for example, information on whether the road is a curved road or a straight road, the curvature of a curve, etc.), information on a road width (information on a lane width), information on the gradient of a road, information on the cant angle of a road, and information on the limited vehicle speed on a road. The various sensors include a yaw rate sensor that detects the yaw rate of the vehicle 2 and an acceleration sensor that detects the acceleration of the vehicle 2. The various actuators include a steering actuator that controls the steering angle of the vehicle 2, a brake actuator that controls the brake system of the vehicle 2, and an engine actuator that controls the engine of the vehicle 2 (or the motor of an electric vehicle).

The autonomous driving ECU 3 searches for a target route, from the current position of the vehicle 2 to the destination, based on the map information stored in the map database, the position information of the vehicle 2 on the map positioned by a positioning unit such as a sensor, and the destination that is set in advance. The autonomous driving ECU 3 generates a travel plan for allowing the vehicle 2 to travel along the target route. The travel plan includes, for example, a steering target value and a vehicle speed target value that are set for each predetermined distance on the target route. The autonomous driving ECU 3 uses a known method to generate a travel plan. The autonomous driving ECU 3 autonomously drives the vehicle 2 according to the travel plan based on the position information on the vehicle 2 on the map positioned by the positioning unit. The autonomous driving ECU 3 sends control signals to various actuators to control the vehicle 2 for autonomously driving the vehicle.

The stereo camera 4 is a capturing device for capturing the image of the area ahead of and behind the vehicle 2. The stereo camera 4 has two capturing cameras arranged to reproduce the disparity between the right eye and the left eye. For example, the two capturing cameras are provided on the vehicle 2, one on the interior side of the front windshield and the other on the interior side of the rear windshield. The stereo camera 4 sends the captured information on the area ahead of and behind the vehicle 2 to the ECU 10. The captured information generated by the stereo camera 4 also includes the information on the depth direction.

The radar sensor 5, provided, for example, at the front end of the vehicle 2, uses radio waves (or light) to detect an obstacle ahead of the vehicle 2 (including an obstacle obliquely in front of the vehicle 2). The radar sensor 5 detects an obstacle by sending radio waves in the forward direction of the vehicle 2 then receiving radio waves reflected by the obstacle such as another vehicle. The radar sensor 5 sends the obstacle information on the detected obstacle to the ECU 10.

Figure 2A:
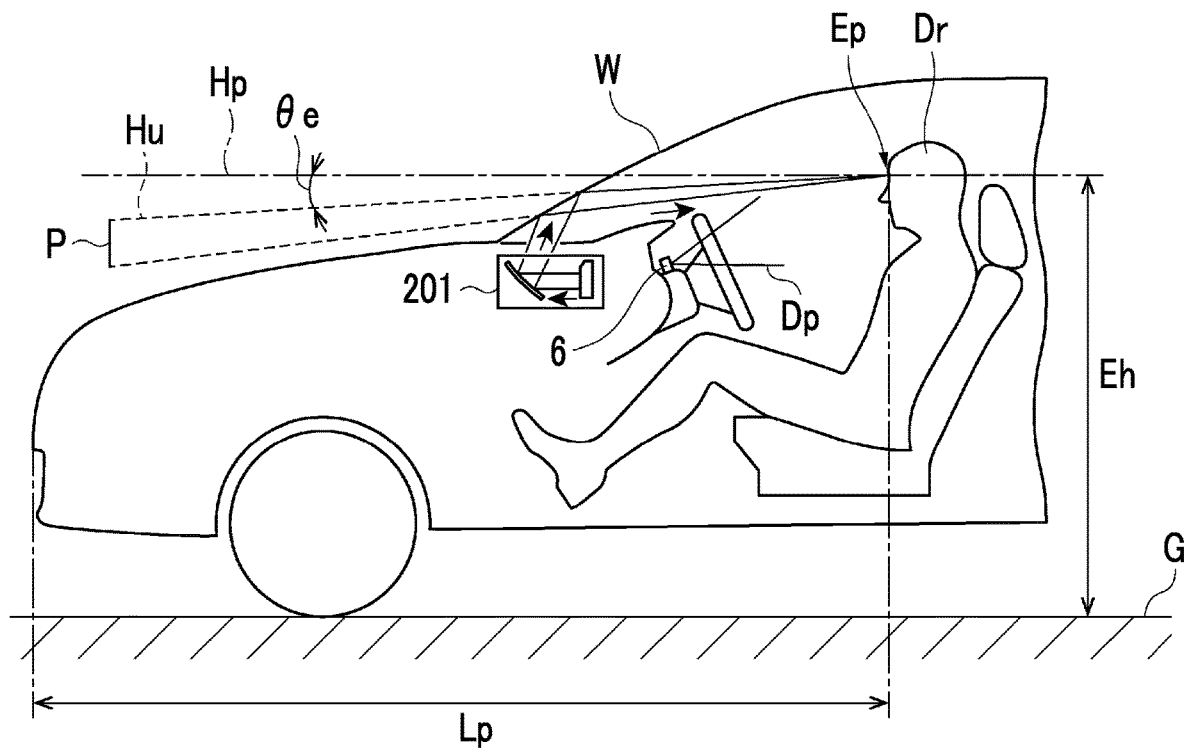
FIG. 2A is a diagram showing the projection of blinking displays on a windshield.

The driver monitor camera 6, provided, for example, on the cover of the steering column of the vehicle 2 and in the position in front of the driver, captures the image of the driver's face (see FIG. 2A). FIG. 2A shows the capturing range Dp of the driver monitor camera 6. The driver monitor camera 6 sends the captured information on the driver Dr to the ECU 10.

The vehicle speed sensor 7 is a detector that detects the vehicle speed of the vehicle 2. An example of the vehicle speed sensor 7 is a wheel speed sensor that is provided on the wheels of the vehicle 2, or on the drive shaft that rotates in synchronization with the wheels, to detect the rotation speed of the wheels. The vehicle speed sensor 7 sends the detected vehicle speed information to the ECU 10.

The ECU 10 is an electronic control unit having a computing device such as a CPU, storage devices such as a ROM and a RAM, a CAN communication circuit, and so on. The function of the ECU 10, which will be described later, is realized when the CPU of the ECU 10 loads a program, stored in the storage device, and executes the loaded program. The ECU 10 is connected to the autonomous driving ECU 3, stereo camera 4, radar sensor 5, driver monitor camera 6, vehicle speed sensor 7, and warning unit 20.

The warning unit 20, mounted on the vehicle 2, sends the information to the driver. The warning unit 20 includes a display projection unit 201 and a sound output unit 202. The display projection unit 201 is a device that projects a display on the display area included in the peripheral visual field of the driver. One example of the display projection unit 261 is a part of the configuration of the head-up display that projects a display of various information on the windshield. The display projection unit 201 projects a display of various information on the windshield based on control signals received from the ECU 10.

Figure 2B:
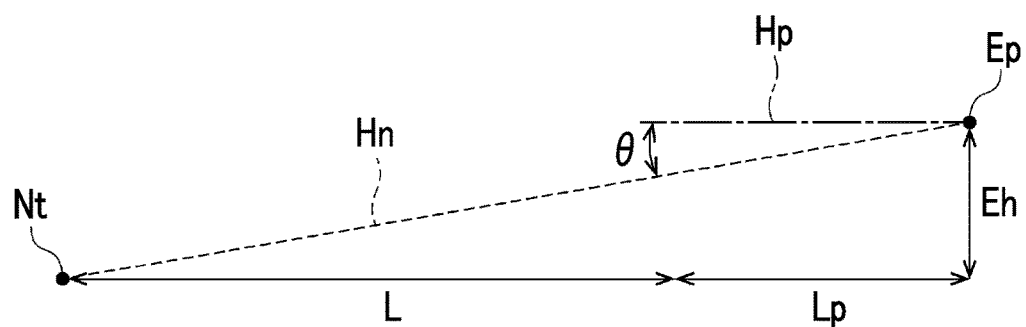
FIG. 2B is a diagram showing a depression angle formed when a driver views the lower end of a preceding vehicle from the driver's eye point.

FIG. 2A is a diagram showing the projection of blinking displays on the windshield. FIG. 2A shows the driver monitor camera 6, the display projection unit 201, a driver Dr, a ground line G corresponding to the ground, a height Eh of a driver's eye point Ep, a straight line Hp extending in the longitudinal direction of the vehicle 2 via the driver's eye point Ep, a light stimulus P, a straight line Hu joining the driver's eye point Ep and the upper end of the light stimulus P, an angle θe formed by the straight line Hp and the straight line Hu, and a distance Lp from the driver's eye point Ep to lire front end of the vehicle 2. The driver's eye point Ep is, for example, a virtual point (one point) representing the position of the eyes of the driver Dr in the normal driving state. The drivers eye point Ep is determined, for example, to be a preset position in the cabin of the vehicle 2. The position of the driver's eye point Ep is determined, for example, when the vehicle 2 is designed or shipped. FIG. 2B will be described later.

Figure 3:
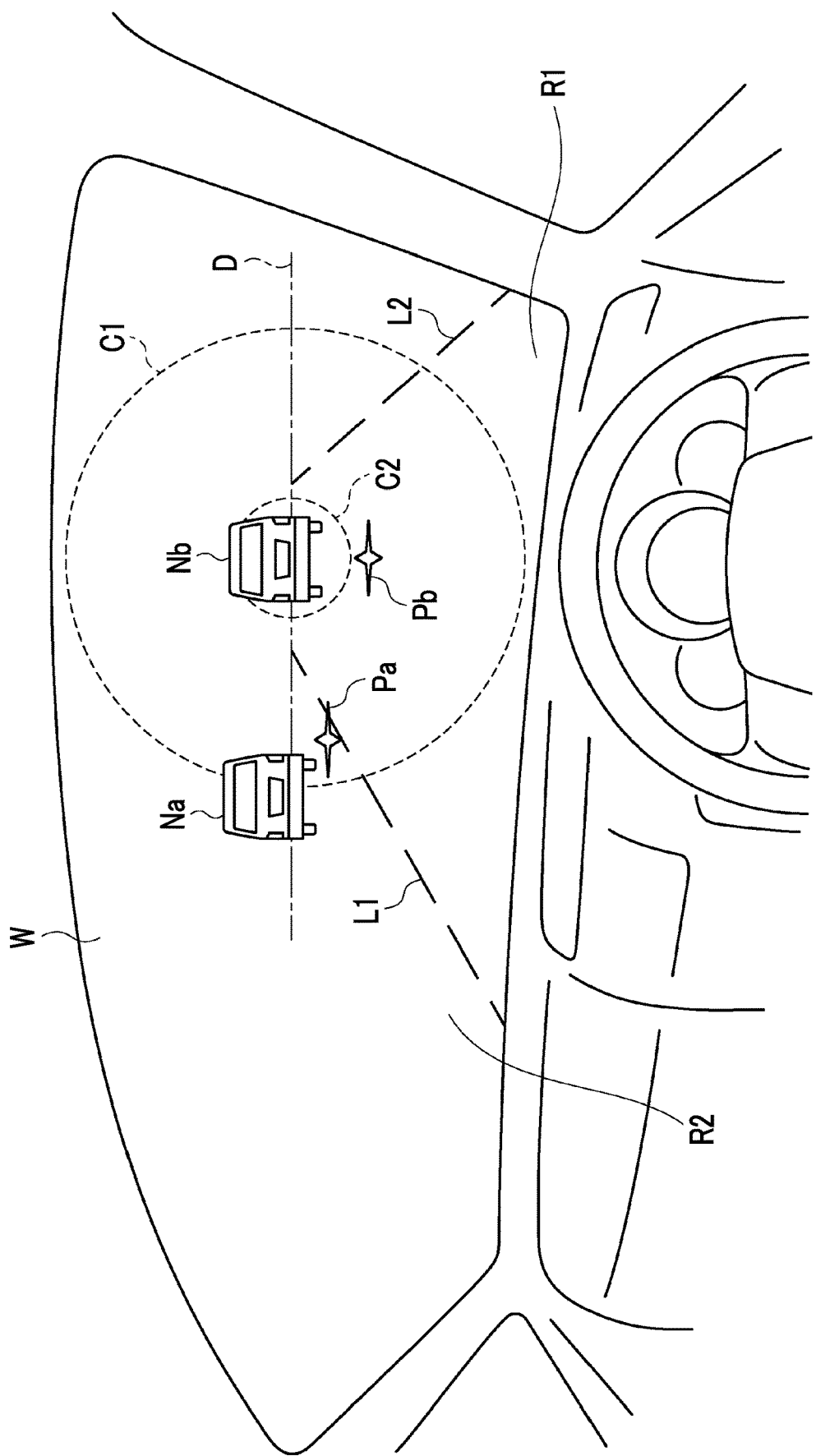
FIG. 3 is a diagram showing blinking displays projected on the windshield.

FIG. 3 is a diagram showing blinking displays projected on the windshield. FIG. 3 shows a windshield W of the vehicle 2, a traveling lane (host vehicle traveling lane) R1 in which the vehicle 2 travels, a left-side white line L1 of the traveling lane R1, a right-side white line L2 of the traveling lane R1, an adjacent lane R2 adjacent to the left side of the traveling lane R1, another vehicle (corresponding to a squeezing candidate vehicle that will be described later) Na traveling in the adjacent lane R2, a preceding vehicle Nb of the vehicle 2, an outer display frame C1 and an inner display frame C2, a reference horizontal line D, a first blinking display Pa (light stimulus P) for causing the driver to pay attention to the other vehicle Na, and a second blinking display Pb (light stimulus P) for causing the driver to pay attention to the preceding vehicle Nb. The first blinking display Pa and the second blinking display Pb are virtual images projected on the windshield W. FIG. 3 will be described later more in detail.

The sound output unit 202, for example, an in-vehicle speaker, is a device that outputs sound.

Next, the functional configuration of the ECU 10 will be described. The ECU 10 includes an another-vehicle recognition unit 101, a white line recognition unit 102, a vehicle speed determination unit 103, a squeezing candidate vehicle determination unit 104, a preceding vehicle determination unit 105, a warning control unit 106, and a first determination unit 107.

The another-vehicle recognition unit 101 recognizes another vehicle around the vehicle 2 based on the information captured by the stereo camera 4 and/or the obstacle information sensed by the radar sensor 5. The another-vehicle recognition unit 101 recognizes the relative position of the other vehicle with respect to the vehicle 2 and the moving direction and moving speed of the other vehicle with respect to the vehicle 2.

The white line recognition unit 102 recognizes the left and right white lines L1 and L2, which form the traveling lane R1, based on the information captured by the stereo camera 4. The white line recognition unit 102 uses a known image processing method to recognize the white lines based on the image captured by the stereo camera 4. The white line recognition unit 102 may recognize the white lines L1 and L2 using the reflection data on the light or radio waves, sensed by the radar sensor 5, based on the obstacle information sensed by the radar sensor 5.

The vehicle speed determination unit 103 determines whether the vehicle speed of the vehicle 2 is equal to or greater than the vehicle speed threshold based on the vehicle speed information sensed by the vehicle speed sensor 7. The vehicle speed threshold is a threshold that is set in advance (for example, 30 km/h). The vehicle speed determination unit 103 determines the vehicle speed of the vehicle 2 because an excessive visual stimulus, if given to the driver when the vehicle 2 is traveling slowly or is stationary, is sometimes annoying.

The squeezing candidate vehicle determination unit 104 determines Whether there is a squeezing candidate vehicle that will squeeze in front of the vehicle 2 if it is determined by the vehicle speed determination unit 103 that the vehicle speed of the vehicle 2 is equal to or greater than the vehicle speed threshold. The squeezing candidate vehicle determination unit 104 determines whether there is a squeezing candidate vehicle based on the recognition result of the another-vehicle recognition unit 101. Squeezing means that another vehicle squeezes between the vehicle 2 and the preceding vehicle. Squeezing includes a case in which, though there is no preceding vehicle, another vehicle squeezes in front of the vehicle 2 (for example, within 10 m from the vehicle 2).

Figure 4:
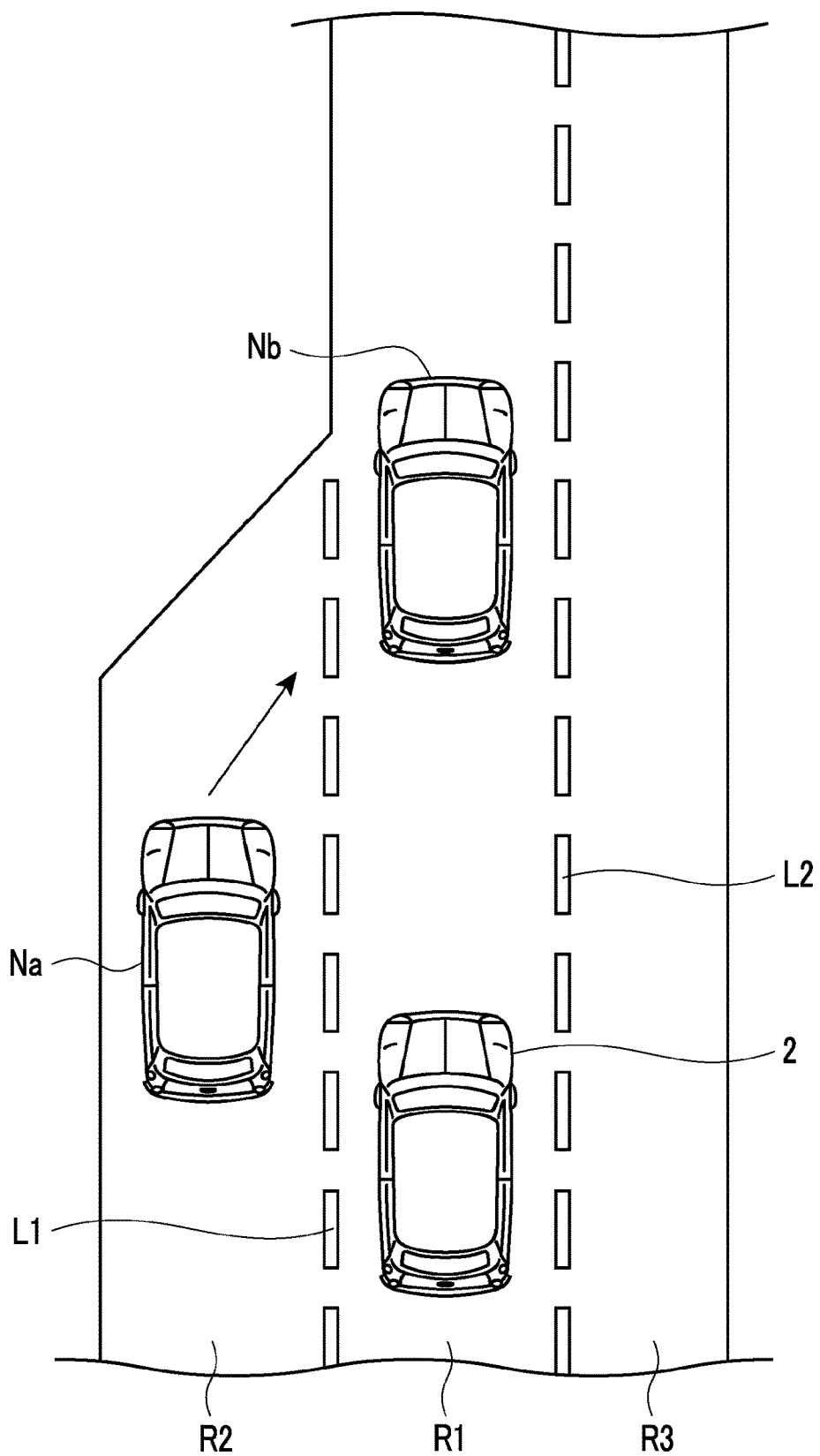
FIG. 4 is a plan view showing a squeezing candidate vehicle and a preceding vehicle.

FIG. 4 is a plan view showing a squeezing candidate vehicle and a preceding vehicle. FIG. 4 shows the vehicle 2, the left-side adjacent lane R2 and a right-side adjacent lane R3 both of which are adjacent to the traveling lane R1, a squeezing candidate vehicle Na. and the preceding vehicle Nb. As shown in FIG. 4, an example of the squeezing candidate vehicle Na is another vehicle that travels in the adjacent lane R2 (or adjacent lane R3) adjacent to the traveling lane R1, in which the vehicle 2 travels, and that satisfies a determination condition that is set in advance. The determination condition may be set based on the following factors: the lateral distance between the other vehicle and the traveling lane R1 of the vehicle 2 (the distance in the width direction of the traveling lane R1), the relative speed between the other vehicle and the vehicle 2, whether or not the direction indicator of the other vehicle is turned on, and the inter-vehicle distance between the vehicle 2 and the preceding vehicle Nb. The adjacent lane R2, though a merging lane that merges into the traveling lane R1 in FIG. 4, need not be a merging lane.

The squeezing candidate vehicle determination unit 104 determines that there is the squeezing candidate vehicle Na if the lateral distance between another vehicle and the traveling lane R1 of the vehicle 2 is equal to or smaller than the lateral distance threshold and if the relative speed between the other vehicle and the vehicle 2 is equal to or smaller than the relative speed threshold. The lateral distance between the other vehicle and the traveling lane R1 of the vehicle 2, which is the distance in the lane width direction of the traveling lane R1 in plan view, may be the distance between the end of the other vehicle on the traveling lane R1 side (the left or right end on the traveling lane R1 side) and the white line L1 of the traveling lane R1 (the white line on the other vehicle side). The relative speed between the other vehicle and the vehicle 2 is the absolute value of the relative speed between the other vehicle and the vehicle 2 in the traveling direction of the vehicle 2. The lateral distance threshold is a value (for example, 1 m) that is set in advance. The relative speed threshold is also & value (for example, 3 km/h) that is set in advance. Usually, the squeezing candidate vehicle Na matches its speed to the speed of the vehicle 2 (in this case, the relative speed becomes close to zero) before actually squeezing in front of the vehicle 2 in order to check the state of the vehicle 2. Considering this behavior of the squeezing candidate vehicle Na, the squeezing candidate vehicle determination unit 104 determines that the relative speed between the squeezing candidate vehicle Na and the vehicle 2 is equal to or smaller than the relative speed threshold. It should be noted that the squeezing candidate vehicle determination unit 104 may determine another vehicle in the adjacent lane traveling in parallel with, or in front of, the vehicle 2 as being the squeezing candidate vehicle Na. In addition, the squeezing candidate vehicle determination unit 104 does not necessarily need to determine the relative speed between another vehicle and the vehicle 2; instead, the squeezing candidate vehicle determination unit 104 may determine whether there is the squeezing candidate vehicle Na based only on the determination result of the lateral distance between the other vehicle and the traveling lane R1.

The squeezing candidate vehicle determination unit 104 determines that there is the squeezing candidate vehicle Na when the direction indicator on the traveling lane R1 side of another vehicle is turned on. The squeezing candidate vehicle determination unit 104 uses a known image processing method to determine whether the direction indicator on the traveling lane R1 side of another vehicle is turned on based on the information captured by the stereo camera 4.

The squeezing candidate vehicle determination unit 104 determines that there is no squeezing candidate vehicle Na if the inter-vehicle distance between the vehicle 2 and the preceding, vehicle Nb is equal to or smaller than the inter-vehicle distance threshold. The inter-vehicle distance threshold is a value (for example, 1 m) that is set in advance. If the inter-vehicle distance between the vehicle 2 and the preceding vehicle Nb is short, the squeezing candidate vehicle determination unit 104 determines that there is no squeezing candidate vehicle Na because there is no room for another vehicle to squeeze in front of the vehicle 2.

The preceding vehicle determination unit 105 determines whether, before the vehicle 2, there is the preceding vehicle Nb whose deceleration is equal to or greater than the deceleration threshold if it is determined by the vehicle speed determination unit 103 that the vehicle speed of the vehicle 2 is equal to or greater than the vehicle speed threshold. The preceding vehicle Nb is a vehicle that is traveling, immediately before the vehicle 2, in the same traveling lane as that of the vehicle 2 (see FIG. 4). As shows in FIG. 4, based on the recognition result of the another-vehicle recognition unit 101 (for example, a change in the speed of the preceding vehicle Nb detected by the radar sensor 5), the preceding vehicle determination unit 105 determines whether there is the preceding vehicle Nb whose deceleration is equal to or greater than the deceleration threshold. The deceleration threshold is a value that is set in advance. The deceleration threshold may be a value that varies according to the inter-vehicle distance between the vehicle 2 and the preceding vehicle Nb. The deceleration threshold may be a value that is smaller as the inter-vehicle distance between the vehicle 2 and the preceding vehicle Nb (or the time to collision) is smaller.

The first determination unit 107 determines whether or not the driver is facing forward. For example, the first determination unit 107 determines whether or not the driver is facing forward based on the image captured by the driver monitor camera 6. The first determination unit 107 uses a known image processing method to make the determination described above. The first determination unit 107 outputs the determination result to the warning control unit 106.

The warning control unit 106 causes the warning unit 20 to present a light stimulus. The warning control unit 106 outputs a signal to the warning unit 20 to control the operation of the display projection unit 201 of the warning unit 20, thereby causing the display projection unit 201 to present a light stimulus to the driver. In this way, the warning control unit 106 can stimulate the vision of the driver.

A specific example of how the warning control unit 106 controls the presentation of a light stimulus will be described. If it is determined by the squeezing candidate vehicle determination unit 104 that there is the squeezing candidate vehicle Na, the warning control unit 106 causes the display projection unit 201 to project the first blinking display Pa on the windshield W (see FIG. 3). The first blinking display Pa is a light stimulus tor alerting the driver to the squeezing candidate vehicle Na.

If it is determined that there is the squeezing candidate vehicle Na, the warning control unit 106 recognizes the image of the squeezing candidate vehicle Na on the windshield W, as viewed by the driver Dr from the driver's eye point Ep, based on the recognition result of the another-vehicle recognition unit 101. For example, based on the image captured by the stereo camera 4, the warning control unit 106 uses a known image processing method (viewpoint conversion processing or the like) to recognize the image of the squeezing candidate vehicle Na.

The warning control unit 106 causes the display projection unit 201 to project the first blinking display Pa within the outer display frame C1, which has a circular shape shown in FIG. 3, in such a manner that the line of sight of the driver Dr is guided toward the image of the squeezing candidate vehicle Na. The outer display frame C1 is a frame of a size large enough to include the effective visual field of the driver Dr when viewing the area ahead of the vehicle 2 from the driver's eye point Ep. The effective visual field is a range that the driver Dr can visually and instantly recognize a target, such as a preceding vehicle, only by eye movement with focus on the target. For example, the effective visual field is a range of an upward angle of 8°, a downward angle of 12°, and a right and left depression angle of 15°. The outer display frame C1 may be an elliptical frame.

The reference horizontal line D shown in FIG. 3 is a virtual horizontal line extending right and left from the image of the preceding vehicle Nb. The warning control unit 106 causes the display projection unit 201 to display the first blinking display Pa in an area below the reference horizontal line D in the outer display frame C1. The outer display frame C1 and the reference horizontal line D are not projected on the windshield W. The outer display frame C1 and the reference horizontal line D need not necessarily be set.

The warning control unit 106 causes the display projection unit 201 to project the first blinking display Pa at a position obliquely below the image of the squeezing candidate vehicle Na (below the image and close to the traveling lane R1) within the outer display frame C1 on the windshield W. For example, the warning control unit 106 causes the display projection unit 201 to display the first blinking display Pa at a position that is closer to the side of the adjacent lane R2 than the white line L1 on the side of the adjacent lane R2 in which the squeezing candidate vehicle Na is traveling. For example, the warning control unit 106 causes the display projection unit 201 to project the first blinking display Pa at a position on the windshield W with a downward depression angle of 3° and a leftward or rightward depression angle of 4°. The warning control unit 106 causes the display projection unit 201 to display the first blinking display Pa in such a way that the first blinking display Pa does not overlap with the image of the squeezing Candidate vehicle Na.

Figure 5:
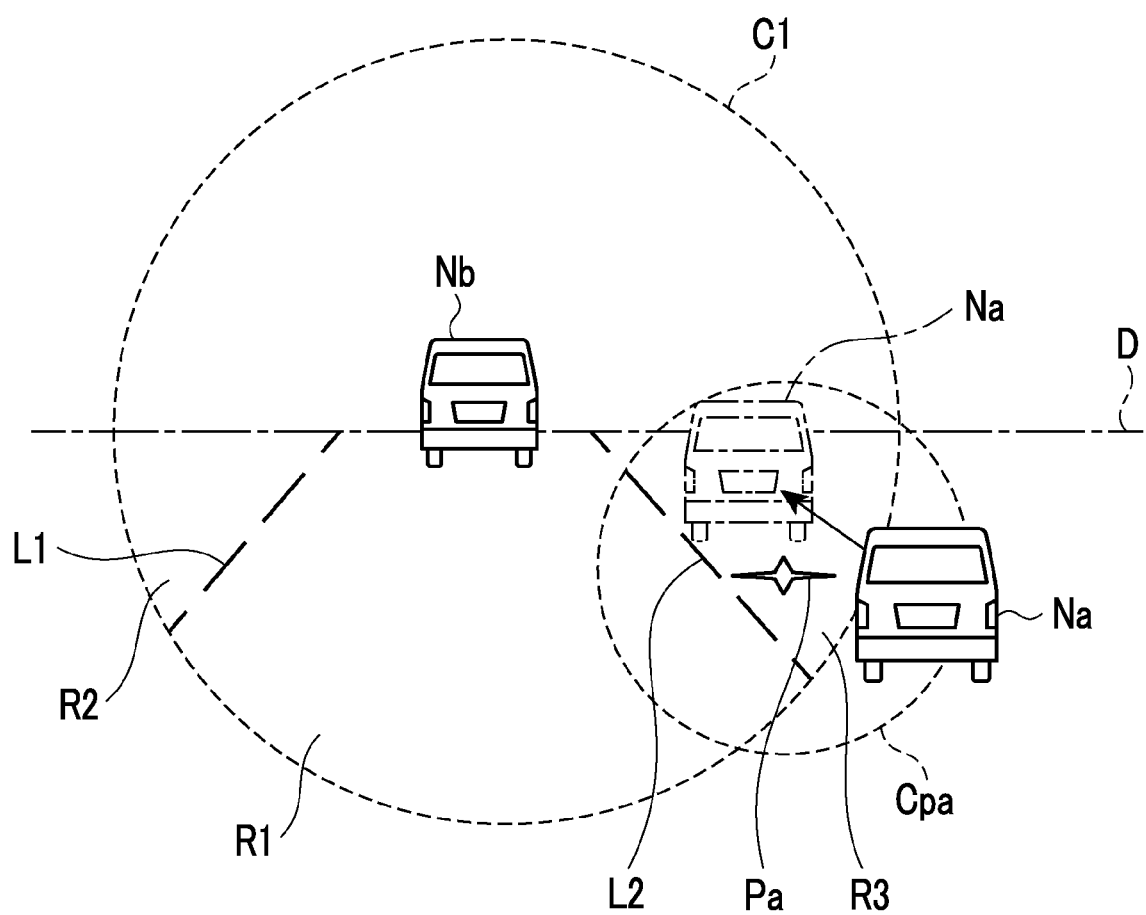
FIG. 5 is a diagram showing the projection of a first blinking display.

FIG. 5 is a diagram showing the projection of the first blinking display Pa. In FIG. 5, the squeezing candidate vehicle Na is traveling in the right-side adjacent lane R3 of the vehicle 2. In FIG. 5, the expected future squeezing candidate vehicle Na is indicated by a broken line. The attention guidance range Cpa is a range to which the attention (line of sight) of the driver, who is looking ahead, is guided by the first blinking display Pa. The attention guidance range Cpa may be a range of a circle centered at the first blinking display Pa on the windshield W with a radius of a fixed distance.

As shown in FIG. 5, the warning control unit 106 may cause the display projection unit 201 to project the first blinking display Pa on the movement path of the image of the squeezing candidate vehicle Na on the windshield W (the movement path as viewed by the driver from the driver's eye point Ep). The warning control unit 106 causes the display projection Unit 201 to project the first blinking display Pa on the moving path of the squeezing candidate vehicle Na on the assumption that the image of the squeezing candidate vehicle Na on the windshield W will move to the position close to the traveling lane R1 (the position indicated by the broken line in FIG. 5). In this way, the warning control unit 106 causes the display projection unit 201 to project the first blinking display Pa on the movement path of the image of the squeezing candidate vehicle Na. This makes it easy to project the first blinking display Pa so that the image of the squeezing candidate vehicle Na in the future is included in the attention guidance range Cpa, thus enhancing robustness (display stability). It should be noted that the warning control unit 106 may cause the display projection unit 201 to project the first blinking display Pa below the movement path.

Next, the projection of the second blinking display Pb by the warning control unit 106 will be described. If it is determined by the preceding vehicle determination unit 105 that, before the vehicle 2, there is the preceding vehicle Nb whose deceleration is equal to or greater than the deceleration threshold, the warning control unit 106 causes the display projection unit 201 to project the second blinking display Pb on the windshield W (See FIG. 3). The second blinking display Pb is a blinking display that alerts the driver to the preceding vehicle Nb.

If it is determined that there is the preceding vehicle Nb whose deceleration is equal to or greater than the deceleration threshold, the warning control unit 106 recognizes the image of the preceding vehicle Nb on the windshield W (the image as viewed by the driver from the eye point Ep) based on the recognition result of the another-vehicle recognition unit 101. For example, the warning control unit 106 uses a known image processing method (viewpoint conversion processing or the like) to recognize the image of the preceding vehicle Nb based on the image captured by the stereo camera 4.

The warning control unit 106 causes the display projection unit 201 to project the second blinking display Pb in such a manner that the driver's line of sight is guided toward the preceding vehicle Nb within the circular outer display frame C1 shown in FIG. 3. The warning control unit 106 causes the display projection unit 201 to project the second blinking display Pb at a position below the image of the preceding vehicle Nb. The inner display frame C2 shown in FIG. 3 is a circular frame that is set to prevent the second blinking display Pb from overlapping with the image of the preceding vehicle Nb. The inner display frame C2 is set to surround the lower part of the image of the preceding vehicle Nb. The warning control unit 106 sets the inner display frame C2 as a larger frame as the distance between the vehicle 2 and the preceding vehicle Nb is shorter. The warning control unit 106 causes the display projection unit 201 to project the second blinking display Pb outside the inner display frame C2 in an area in the outer display frame C1 and below the reference horizontal line D. The inner display frame C2 is not projected on the windshield W, and the inner display frame C2 need not necessarily be set.

The warning control unit 106 may cause the display projection unit 201 to project the second blinking display Pb using the following method. In the description below, consider the state in which the vehicle 2 is viewed from the side as shown in FIG. 2A. The height Eh of the driver's eye point Ep and the distance Lp from the driver's eye point Ep to the front end of the vehicle 2, both of which are shown in FIG. 2A, are characteristic values determined, for example, by vehicle type. The difference in the appearance (difference in scale) between the image of the preceding vehicle Nb as viewed from the driver's eye point Ep and the image of the preceding vehicle Nb as viewed from the windshield W is determined by the characteristic values described above. The scale of the image of the preceding vehicle Nb is changed according to the distance from the vehicle 2 to the preceding vehicle Nb and according to the characteristic values described above.

FIG. 2B is a diagram showing the depression angle θ when a lower end Nt of the preceding vehicle Nb is viewed from the driver's eye point Ep. FIG. 2B shows the lower end (lower end of the rear wheels) Nt of the preceding vehicle Nb, a distance L from the front end of the vehicle 2 to the lower end of the preceding vehicle Nb in the longitudinal direction of the vehicle 2, a straight line Hn joining the driver's eye point Ep and the lower end Nt of the preceding vehicle Nb, and the angle θ formed by the straight line Hn and the straight line Hp. The straight line Hp is a straight line passing through the driver's eye point Ep and extending in the longitudinal direction of the vehicle 2. The lower end Nt of the preceding vehicle Nb is the lower end of the preceding vehicle Nb in the three-dimensional space. The lower end Nt of the preceding vehicle Nb can be identified by known image processing, for example, based on the image captured by the stereo camera 4. Furthermore, the distance L from the front end of the vehicle 2 to the lower end Nt of the preceding vehicle Nb in the longitudinal direction of the vehicle 2 can be detected, for example, based on the image captured by the stereo camera 4 (captured image including depth information) or the obstacle information sensed by the radar sensor 5. Alternatively, the inter-vehicle distance between the vehicle 2 and the preceding vehicle Nb may be used simply as the distance L. The angle θ between the straight line Hn and the straight line Hp corresponds to the depression angle formed when the driver views the lower end Nt of the preceding vehicle Nb from the driver's eye point Ep. The depression angle θ can be calculated, for example, by the following equation (1).

$$\theta = \text{Tan}-1\{Eh/(L+Lp)\} \quad (1)$$

On the other hand, as shown in FIG. 2A, the angle between the straight line Hu, which joins the driver's eye point Ep and the upper end of the second blinking display Pb, and the straight line Hp is defined as an angle (depression angle) θe. In this case, the warning control unit 106 causes the display projection unit 201 to project the second blinking display Pb on the windshield W so that the depression angle θ<depression angle θe. That is, the warning control unit 106 causes the display projection unit 20:1 to project the second blinking display Pb so that the depression angle θe, formed when the driver views the upper end of the second blinking display Pb, is larger than the depression angle θ formed when the driver views the lower end Nt of the preceding vehicle Nb from the driver's eye point Ep (a larger downward angle with reference to the straight line Hp). The warning control unit 106 determines the position of the upper end of the second blinking display Pb (the position in the vertical direction) so that the depression angle θ< the depression angle θe, for example, based on the depression angle θ calculated from the above equation (1). Also, the warning control unit 106 determines the position of the second blinking display Pb in the horizontal direction based on the image of the preceding vehicle Nb. In this case, the warning control unit 106 can cause the display projection unit 201 to project the second blinking display Pb at a position below the image of the preceding vehicle Nb based on the upper-end position and the position in the horizontal direction, which have been determined as described above, of the second blinking display Pb.

Furthermore, if it is determined by the first determination unit 107 that the driver is not facing forward while a light stimulus is being presented, the warning control unit 106 causes the warning unit 20 to perform a first warning. In this embodiment, the first warning is a sound output by the sound output unit 202. The warning control unit 106 outputs a signal to the warning unit 20 to control the operation of the sound output unit 202 of the warning unit 20, thereby outputting the sound in the interior of the vehicle. In this way, the warning control unit 106 can stimulate the hearing sense of a driver who is not racing forward.

The vehicle system 1 is configured by the warning control unit 106, first determination unit 107, and warning unit 20 described above.

[Processing Content of ECU 10]

The processing performed by the ECU 10 will be described.

[Light Stimulus Presentation Start Processing]

Figure 6:
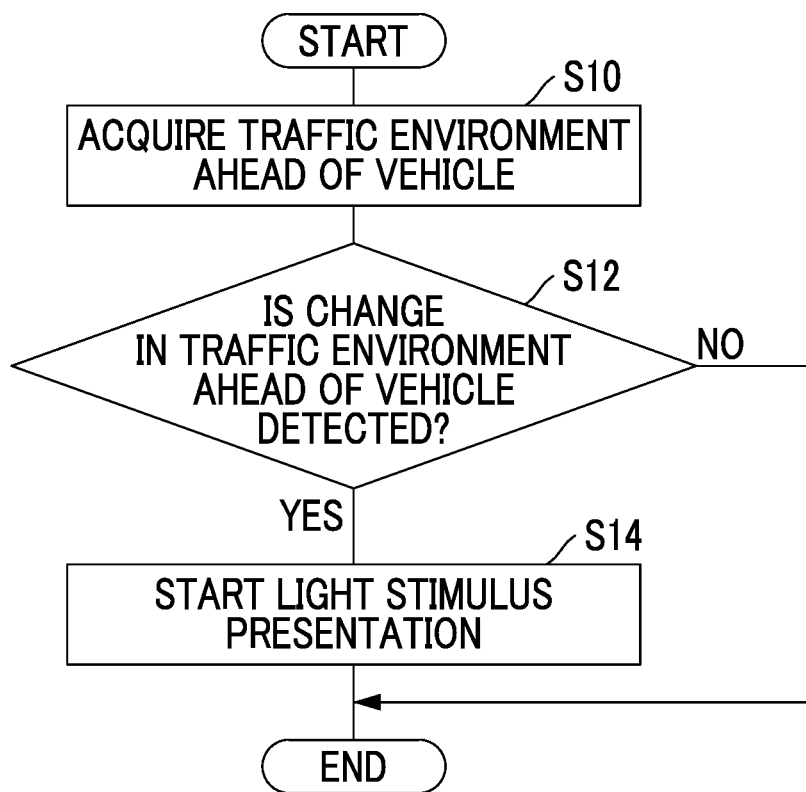
FIG. 6 is a flowchart of light stimulus presentation start processing.

First, the processing of starting the presentation of a light stimulus will be described. FIG. 6 is a flowchart of the light stimulus presentation start processing. The flowchart shown in FIG. 6 is performed by the ECU 10, for example, when the display control button is turned on by the driver.

The ECU 10 performs the traffic environment acquisition processing (S10) to acquire the traffic environment ahead of the vehicle 2. Next, the ECU 10 performs the change determination processing (S12) to determine whether a change in the traffic environment ahead of the vehicle 2 is detected. If the preceding vehicle of the vehicle 2 decelerates at a rate equal to or higher than the deceleration threshold or if there is a vehicle that is going squeeze in front of the vehicle 2, the ECU 10 detects a change in the traffic environment. If a change in the traffic environment is detected by the change determination processing (S12), the warning control unit 106 of the ECU 10 performs the light stimulus presentation start processing (S14) to cause the display projection unit 201 to project a light stimulus.

If a light stimulus is projected by the display projection unit 201 in the light stimulus start processing (S14) or if a change in the traffic environment is not detected in the change determination processing (S12), the ECU 10 terminates the flowchart shown in FIG. 6. If a light stimulus is not being presented and if the display control button is not turned off by the driver, the ECU 10 performs the flowchart shown in FIG. 6 from the beginning. If a light stimulus is being presented or if the display control button is turned off by the driver, the ECU 10 does not repeatedly perform the flowchart shown in FIG. 6. The ECU 10 performs the flowchart shown in FIG. 6 to present a light stimulus to the driver according to the change in the environmental.

[Light Stimulus Presentation Termination Processing]

Figure 7:
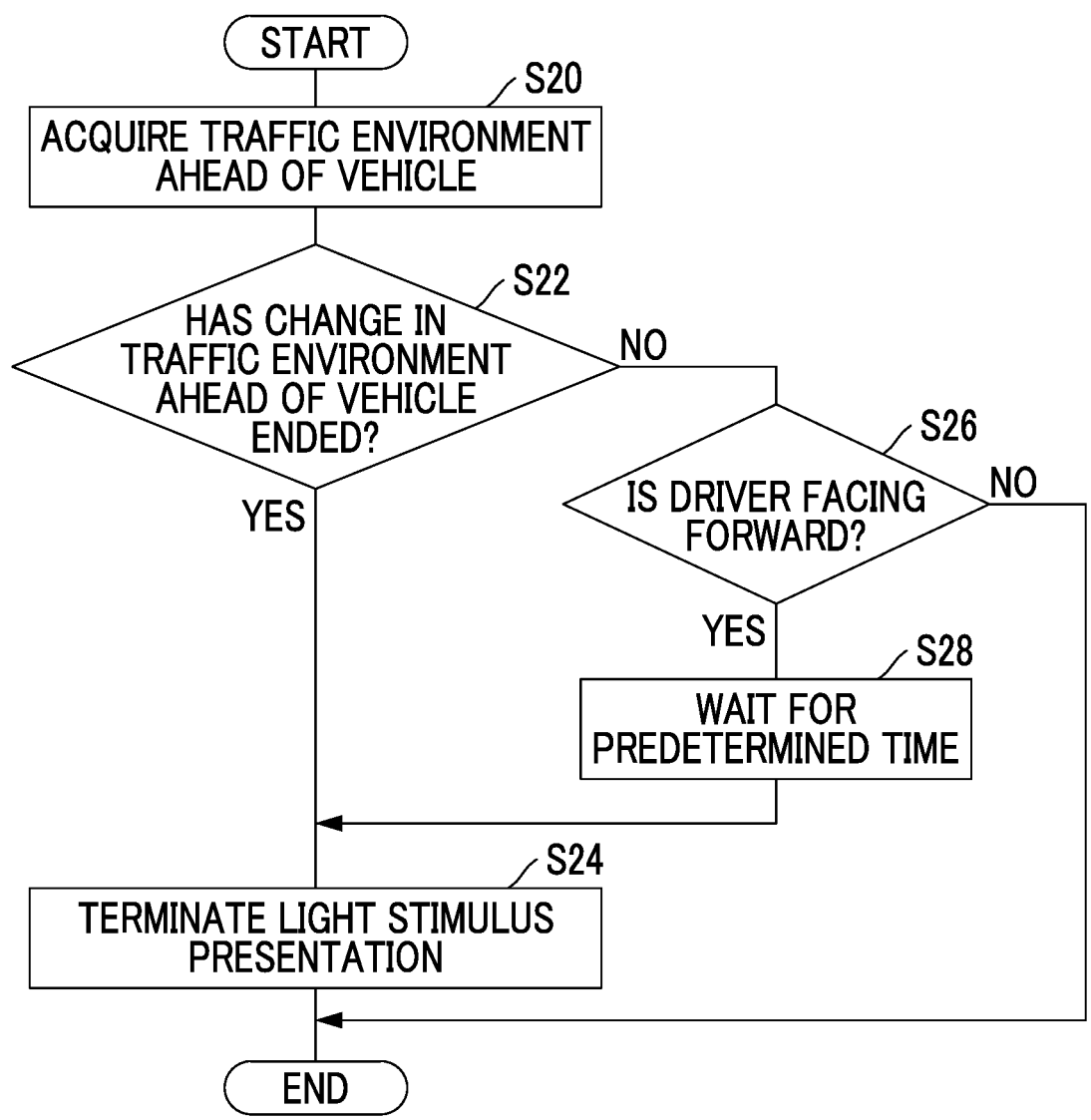
FIG. 7 is a flowchart of light stimulus presentation termination processing.

Next, the light stimulus presentation termination processing will be described. FIG. 7 is a flowchart of the light stimulus presentation termination processing. The flowchart shown in FIG. 7 is performed by the ECU 10, for example, after a light stimulus is presented.

The ECU 10 performs the traffic environment acquisition processing (S20) to acquire the traffic environment ahead of the vehicle 2. Next, the ECU 10 performs the traffic environment change end determination processing (S22) to determine whether the change in the traffic environment ahead of the vehicle 2 has ended. If a predetermined time has elapsed after the preceding vehicle of the vehicle 2 started decelerating at a rate equal to or higher than the deceleration threshold or if the squeezing in front of the vehicle 2 is completed, the ECU 10 determines that the change in the traffic environment has ended.

If the traffic environment change has ended, the warning control unit 106 of the ECU 10 performs the light stimulus presentation termination processing (S24) to terminate the presentation of the light stimulus. After that, the ECU 10 terminates foe flowchart shown in FIG. 7. If the presentation of the light stimulus is terminated, the ECU 10 does not repeatedly perform the flowchart shown in FIG. 7.

On the other hand, if it is determined in the traffic environment change end determination processing that the change in the traffic environment has not ended (S22), the warning control unit 106 performs the face orientation determination processing (S26) to determine Whether the driver is facing forward. If it is recognized that the driver's face is oriented to the front based on the result captured by the driver monitor camera 6, the warning control unit 106 determines that the driver is facing forward. If it is recognized that the driver's face is not oriented to the front based on the result captured by the driver monitor camera 6, the warning control unit 106 determines that the driver is not facing forward.

If it is determined in the face orientation determination processing (S26) that the driver is facing forward, the warning control unit 106 performs the waiting processing (S28) to wait for a predetermined time and then proceeds to the light stimulus presentation termination processing (S24). By waiting for a predetermined time, the warning control unit 106 prevents the presentation of a light stimulus from being finished so quickly that the light stimulus cannot be recognized by the driver. The processing performed after the light stimulus presentation termination processing (S24) is the same as that described above.

If it is determined in the face orientation determination processing (S26) that the driver is not facing forward, the warning control unit 106 terminates the flowchart shown in FIG. 7. If a light stimulus is being presented, the ECU 10 performs the flowchart, shown in FIG. 7, from the beginning.

As described above, the presentation of a light stimulus is terminated when the change in the traffic environment ahead of the vehicle 2 has ended or when the driver is facing forward.

[First Warning Start Processing]

Figure 8:
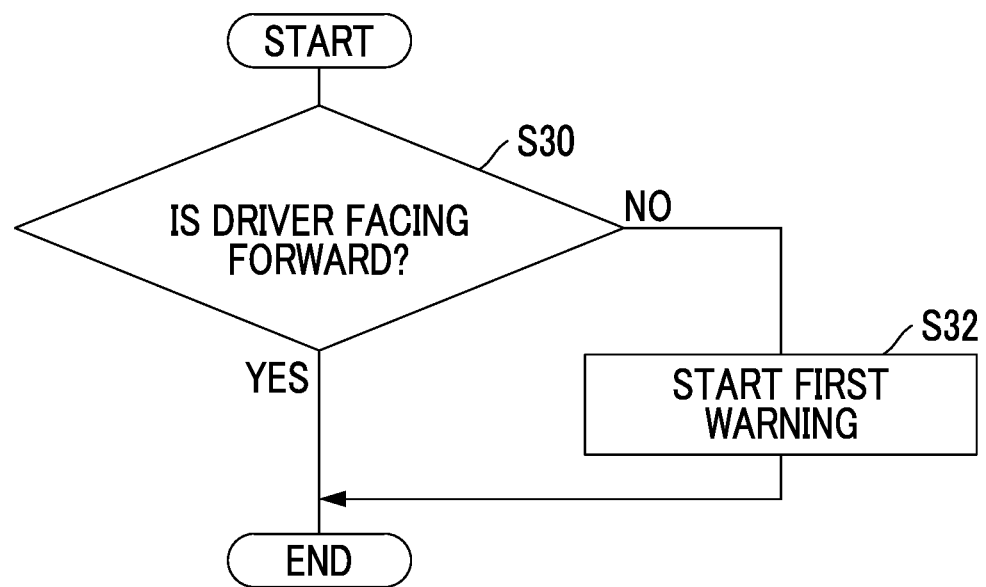
FIG. 8 is a flowchart of first warning start processing.

Next, the first warning start processing will be described. FIG. 8 is a flowchart of the first warning start processing. The flowchart shown in FIG. 8 is performed by the ECU 10, for example, after presenting a light stimulus.

The warning control unit 166 of the ECU 10 performs the race orientation determination processing (S30) to determine whether the driver is facing forward. This processing is the same as the face orientation determination processing (S26).

If it is determined in the face orientation determination processing (S30) that the driver is facing forward, the warning control unit 106 terminates the flowchart shown in FIG. 8. If a light stimulus is being presented and if the first warning is not being performed, the ECU 50 performs the flowchart, shown in FIG. 8, from the beginning.

If it is determined in the face orientation determination processing (S30) that the driver is not facing forward, the warning control unit 106 performs the warning start processing (S32) to cause the warning unit 20 to start the first warning. The sound output unit 202 of the warning unit 20 outputs a sound as the first warning. When the warning start processing (S32) is terminated, the ECU 10 terminates the flowchart shown in FIG. 8, When the first warning is started, the ECU 10 does not repeatedly perform the flowchart shown in FIG. 8.

[First Warning Termination Processing]

Figure 9:
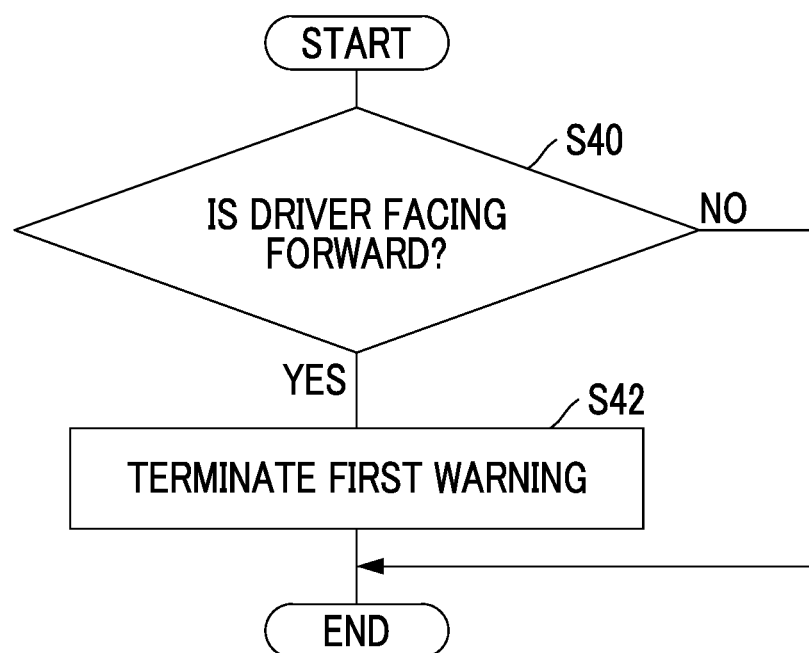
FIG. 9 is a flowchart of first warning termination processing.

Next, the first warning termination processing will be described. FIG. 9 is a flowchart of the first warning termination processing. The flowchart shown in FIG. 9 is performed by the ECU 10, for example, after the first warning is started.

The warning control unit 106 of the ECU 10 performs the face orientation determination processing (S40) to determine whether the driver is facing forward. This processing is the same as the face orientation determination processing (S26).

If it is determined in the face orientation determination processing (S40) that the driver is facing forward, the warning control unit 106 performs the warning termination processing (S42) to cause the warning unit 20 to terminate the first warning. Upon completion of the warning termination processing (S42), the ECU 10 terminates the flowchart shown in FIG. 9. When the first warning is terminated, the ECU 10 does not repeatedly perform the flowchart shown in FIG. 9.

If it is determined in the face orientation determination processing (S40) that the driver is not facing forward, the ECU 10 terminates the flowchart shown in FIG. 9. If the first warning is being performed, the ECU 10 performs the flowchart, shown in FIG. 9, from the beginning.

[Effect of the Vehicle System 1]

In the vehicle system 1, when a change in the traffic environment ahead of the vehicle 2 is detected during antonomous driving, the head up display of the vehicle 2 is used to present a light stimulus to the driver of the vehicle 2. A light stimulus, presented in this way, prompts the driver who is aware of driving to pay attention ahead. If it is determined by the first determination unit 107 that the driver is not facing forward while a light stimulus is being presented, the warning unit 20 performs the first warning that is a sound output by the sound output unit 202. A sound, output in this way, allows the vehicle system 1 to give a stimulus also to a non-visual sense of the driver who is not facing forward while a light stimulus is being presented, thus encouraging the driver to face forward. In this way, the vehicle system 1 can encourage the driver to pay attention to driving according to the state of the driver.

Second Embodiment

A vehicle system 1A according to a second embodiment is different from the vehicle system 1 according to the first embodiment in that a vibration generation unit 203 is provided instead of the sound output unit 202. The other components are the same as those of the first embodiment. In the description of the vehicle system 1A, the description similar to that of the vehicle system 1 is omitted.

Figure 10:
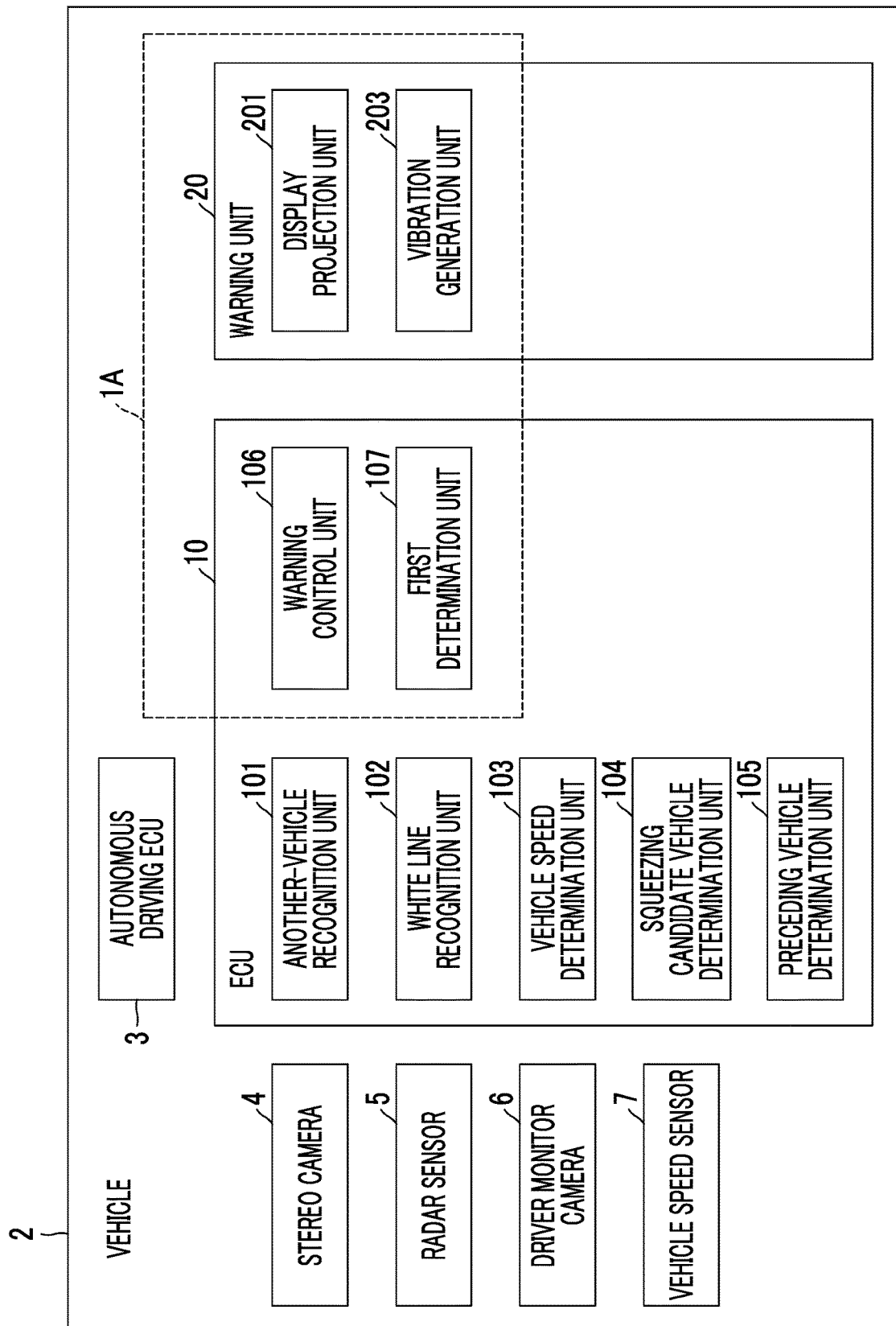
FIG. 10 is a functional block diagram of a vehicle including a vehicle system according to a second embodiment.

FIG. 10 is a functional block diagram of the vehicle 2 having the vehicle system 1A according to the second embodiment. As shown in FIG. 10, the difference in the configuration between the vehicle system 1A and the vehicle system 1 is that the vehicle system 1A does not include the sound output unit 202 but includes the vibration generation unit 203. The other configuration is the same as that of the vehicle system 1.

The vibration generation unit 203 is a device that generates a vibration. For example, the vibration generation unit 203 has a weight having a biased center of gravity and a motor for rotating the weight. The vibration generation unit 203 may use a known structure. The vibration generation unit 203 is arranged in the interior of the vehicle. More specifically, the vibration generation unit 203 is provided in the steering wheel, the seat, the armrest, and the like.

When performing the first warning, the vehicle system 1A uses a vibration generated by the vibration generation unit 203. The other processing of the vehicle system 1A is identical to that of the vehicle system 1.

[Effect of the Vehicle System 1A]

In the vehicle system 1A, when a change in the traffic environment ahead of the vehicle 2 is detected during autonomous driving, the head-up display of the vehicle 2 is used to present a light stimulus to the driver of the vehicle 2. A light stimulus, presented in this way, prompts the driver who is aware of driving to pay attention ahead. In addition, in the vehicle system 1A, if it is determined by the first determination unit 107 that the driver is not facing forward while a light stimulus is being presented, the warning unit 20 performs a first warning that is a vibration generated by the vibration generation unit 203. A vibration, generated in this way allows the vehicle system 1A to give a stimulus also to a non-visual sense of the driver Who is not facing forward while a light stimulus is being presented, thus encouraging the driver to face forward. In this way the vehicle system 1A can encourage the driver to pay attention to driving according to the state of the driver.

Third Embodiment

A vehicle system 1B according to a third embodiment is different from the vehicle system 1 according to the first embodiment in that a second determination unit 108 and a vibration generation unit. 203 are provided and in the processing content of a warning control unit 106B. The other components and processing content are the same as those of the first embodiment. In the description of the vehicle system 1B, the description similar to that of the vehicle systems 1 and 1A is omitted.

Figure 11:
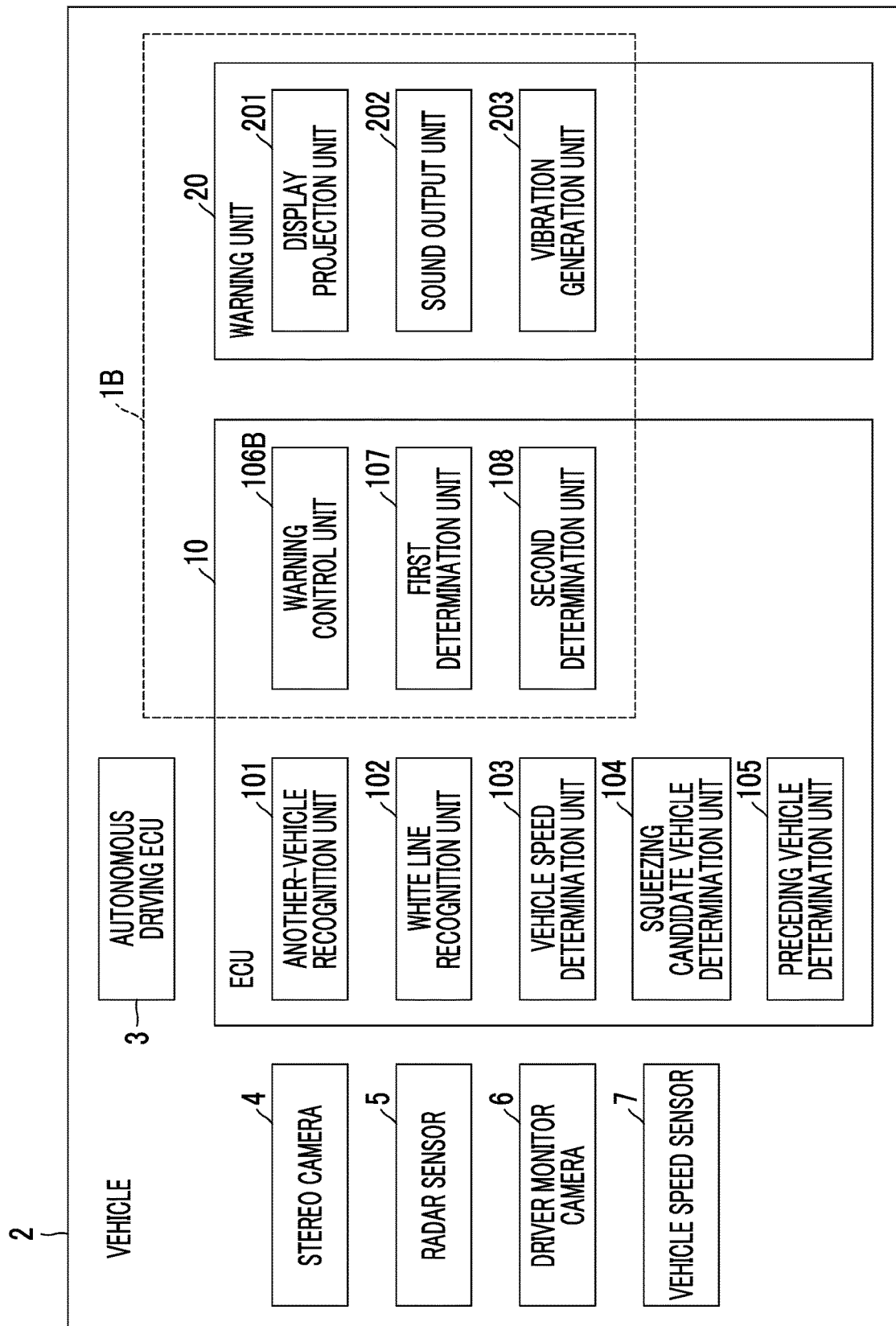
FIG. 11 is a functional block diagram of a vehicle including a vehicle system according to a third embodiment.

FIG. 11 is a functional block diagram of the vehicle 2 having the vehicle system 1B according to the third embodiment. As shown in FIG. 11, the difference in the configuration between the vehicle system 1B and the vehicle system 1 is that the vehicle system 1B includes the warning control unit 106B, the function of which is partially different from that of the warning control unit 106, the second determination unit 108, and the vibration generation unit 203. The other configuration is the same as that of the vehicle system 1.

The second determination unit 108 determines whether the driver holds the steering wheel. For example, the second determination unit 108 determines whether the driver holds the steering wheel based on the result sensed by the pressure sensor provided in the steering wheel or based on the result captured by the driver monitor camera 6. The second determination unit 108 outputs the determination result to the warning control unit 106B.

When performing the first warning, the warning control unit 106B of the vehicle system 1B causes the warning unit 20 to perform the first warning that is either a vibration generated by the vibration generation unit 203 or a sound output by the sound output unit 202.

The warning control unit 106B causes the warning unit 20 to perform a second warning while a light stimulus is being presented if it is determined by the first determination unit 107 that the driver is not facing forward and if it is determined by the second determination unit 108 that the driver does not hold the steering wheel before a predetermined time elapses after the first warning is started. The second warning is a warning that includes both a vibration, generated by the vibration generation unit 203, and a sound output by the sound output unit 202. The warning control unit 106B provides two warnings, a first warning and a second warning, and switches the warning according to the level of the drivers driving awareness. The warning control unit 106B determines a driver who does not turn the face toward the front in response to a light stimulus but is holding (or once held) the steering wheel as not being a driver whose wakefulness level is extremely low or as a driver whose driving awareness level is extremely low. On the other hand, the warning control unit 106B determines a driver who does not turn the face toward the front in response to a light stimulus and is not holding the steering wheel as being a driver whose wakefulness level is extremely low or as a driver whose driving awareness level is extremely low. For such a driver, the warning control unit 106B outputs the second warning stronger than the first warning. The second warning is a warning that has a warning level higher than that of the first warning or a warning that excites more senses than the first warning.

[First Warning Termination Processing and Second Warning Start Processing]

Figure 12:
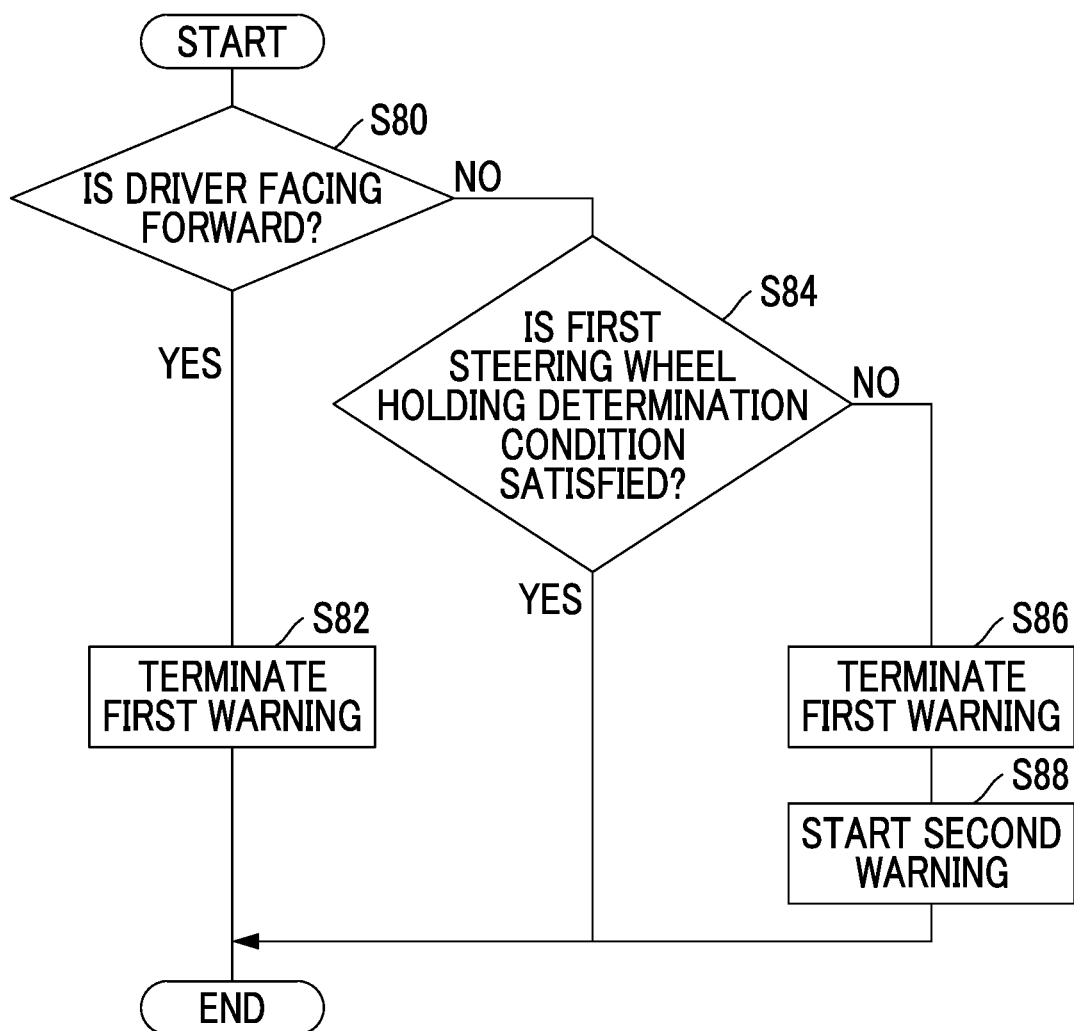
FIG. 12 is a flowchart of first warning termination processing and second warning start processing.

Next, the second warning start processing will be described. FIG. 12 is a flowchart showing the second warning start processing. The flowchart shown in FIG. 12 is performed by the ECU 10, for example, after the start of the first warning. The flowchart shown in FIG. 12 also includes the first warning termination processing.

The warning control unit 106B of the ECU 10 performs the face orientation determination processing (S80) to determine whether the driver is facing forward. This processing is the same as the face orientation determination processing (S26).

If it is determined in the face orientation determination processing (S80) that the driver is facing forward, the warning control unit 106B performs the warning termination processing (S82) to cause the warning unit 20 to terminate the first warning. This processing is the same as the warning termination processing (S42). When the warning termination processing (S82) is completed, the ECU 10 terminates the flowchart shown in FIG. 12. When the first warning is terminated, the ECU 10 does not repeatedly perform the flowchart shown in FIG. 12.

If it is determined in the face orientation determination processing (S80) that the driver is not facing forward, the second determination unit 108 of the ECU 10 performs the first steering wheel holding, determination processing (S84) to determine whether the driver is holding the steering wheel.

If it is determined in the first steering wheel holding determination processing (S84) that the driver is holding the steering wheel, the ECU 10 performs the flowchart, shown in FIG. 12, from the beginning.

On the other hand, if it is determined in the first steering wheel holding determination processing (S84) that the driver is not holding the steering wheel, the warning control unit 106B performs the warning termination processing (S86) to cause the warning unit 20 to terminate the first warning. The warning termination processing (S86) warning control unit 106B performs the warning start processing (S88) to cause the warning unit 20 to perform the second warning that includes a vibration, generated by the vibration generation unit 203, and a sound output by the sound output unit 202. When the first warning is terminated and the second warning is started, the ECU 10 does not repeatedly perform the flowchart shown in FIG. 12.

[Second Warning Termination Processing]

Figure 13:
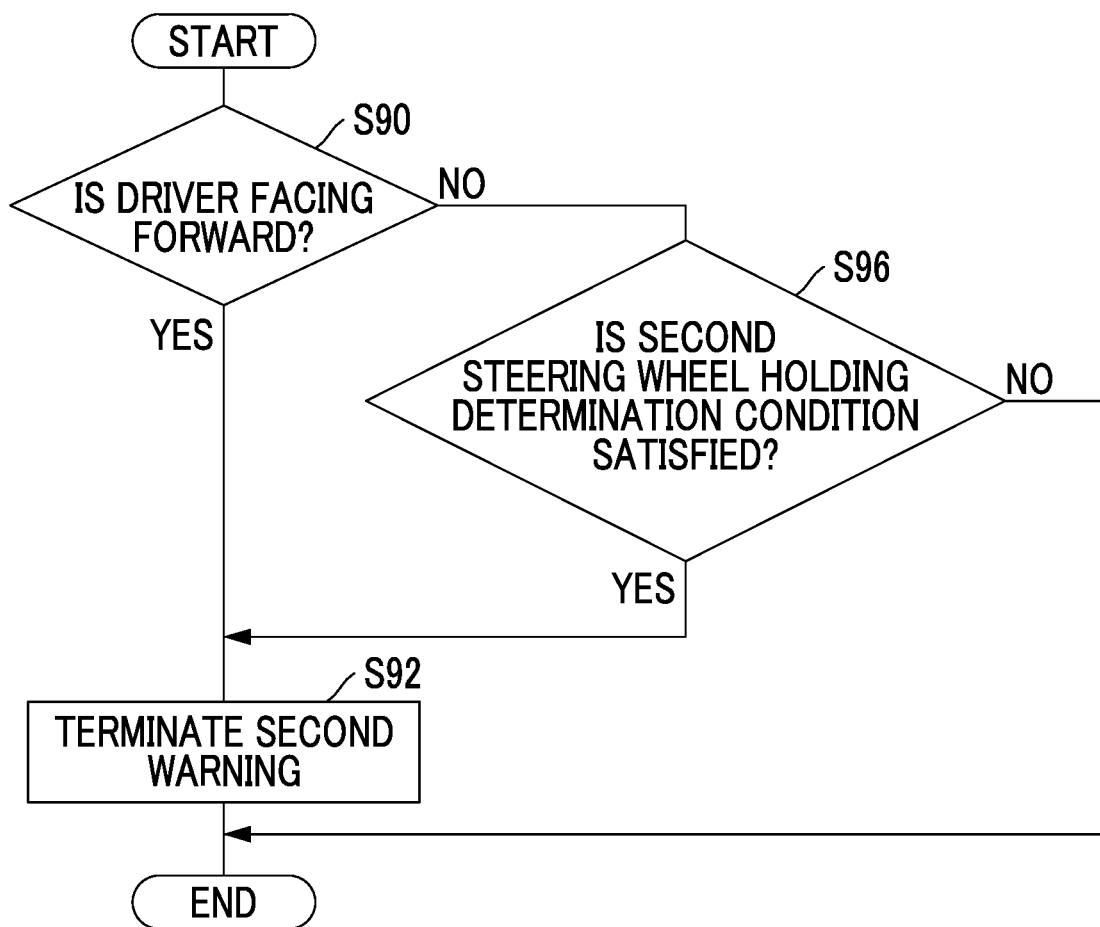
FIG. 13 is a flowchart of second warning termination processing.

Next, the second warning termination processing will be described. FIG. 13 is a flowchart showing the second warning termination processing. The flowchart shown in FIG. 13 is performed by the ECU 10, for example, after the start of the second warning.

The warning control unit 106B of the ECU 10 performs the face orientation determination processing (S90) to determine whether the driver is facing forward. This processing is the same as the face orientation determination processing (S26).

If it is determined in the race orientation determination processing (S90) that the driver is facing forward, the warning control unit 106B performs the warning termination processing (S92) to cause the warning unit 20 to terminate the second warning. When the warning termination processing (S92) is completed, the ECU 10 terminates the flowchart shown in FIG. 13. When the second warning is terminated, the ECU 10 does not repeatedly perform the flowchart shown in FIG. 13.

If it is determined in the face orientation determination processing (S90) that the driver is not facing forward, the second determination unit 108 of the ECU 10 performs the second steering wheel holding determination processing (S96) to determine whether the driver is holding the steering wheel.

If it is determined in the second steering wheel holding determination processing (S96) that the driver is holding the steering wheel, the warning control unit 106B performs the warning termination processing (S92) to cause the warning unit 20 to terminate the second warning. The subsequent processing is the same as that described above.

On the other hand, if it is determined in the second steering wheel holding determination processing (S96) that the driver is not holding the steering wheel, the ECU 10 terminates the flowchart shown in FIG. 13. The ECU 10 performs the flowchart, shown in FIG. 13, from the beginning.

[Effect of the Vehicle System 1B]

The vehicle system 1B can give the second warning, which is stronger than the first warning, to a driver whose wakefulness level is further reduced or to a driver who relies on autonomous driving so much that the interest in driving is further reduced.

Fourth Embodiment

A vehicle system 1C according to a fourth embodiment is different from the vehicle system 1B according to the third embodiment in that a vehicle control unit 109 is provided and in the processing content of a warning control unit 106C. The other components and processing content are the same as those of the third embodiment. In the description of the vehicle system 1C, the description similar to that of the vehicle systems 1, 1A, and 1B is omitted.

Figure 14:
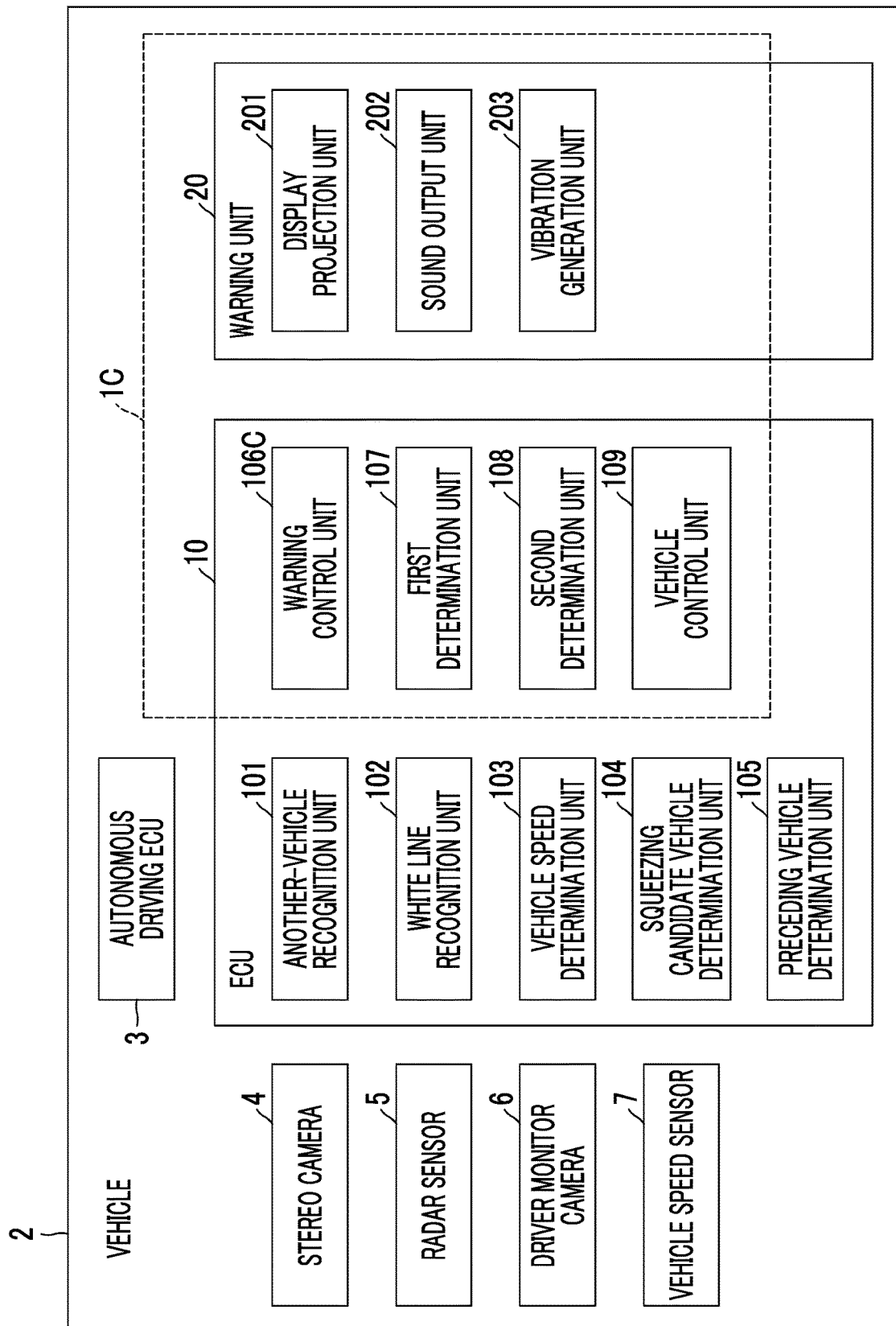
FIG. 14 is a functional block diagram of a vehicle including a vehicle system according to a fourth embodiment.

FIG. 14 is a functional block diagram of the vehicle 2 having the vehicle system 1C according to the fourth embodiment. As shown in FIG. 14, the difference in the configuration between the vehicle system 1C and the vehicle system 1B is that the vehicle system IC includes the warning control unit 106C, the function of which is partially different from that of the warning control unit 106, and the vehicle control unit 109. The other configuration is the same as that of the vehicle system 1B.

The warning control unit 106C increments the number of re-holding times if it is determined by the first determination unit 107 that the driver faces forward before a predetermined time elapses after the second warning is started or if it is determined by the second determination unit 108 that the driver holds the steering wheel before a predetermined time elapses after the second warning is started. The number of re-holding times refers to the number of times the driver re-holds the steering wheel in response to the second warning. There is a possibility that a driver who receives the warning many times is overconfident in autonomous driving. With this possibility in mind, the warning control unit 106C increments the number of re-holding times, stored in the storage unit, for use in identifying a driver who receives the warning while a light stimulus is being presented and, in response to the warning, re-holds the steering wheel in a hurry before the vehicle 2 is forced to stop.

The vehicle control unit 109 controls the operation of the vehicle 2. If the number of re-holding times while a light stimulus is being presented is equal to or greater than the threshold, the vehicle control unit 109 outputs the signal for terminating the autonomous driving of the vehicle 2 to the autonomous driving ECU 3 of the vehicle 2. In this way, a driver who is overconfident in autonomous driving is prohibited from driving in the autonomous mode.

In addition, if it is determined by the second determination unit 108 that the driver does not hold the steering wheel before a predetermined time elapses after the second warning is started, the vehicle control unit 109 decelerates or stops the vehicle 2. A driver who is not awake is response to the second warning is considered a driver with an extremely low wakefulness level. In this case, the vehicle control unit 109 operates various actuators to perform the emergency processing for decelerating or stopping the vehicle 2.

[Light Stimulus Presentation Termination Processing and Count Resetting Processing]

Figure 15:
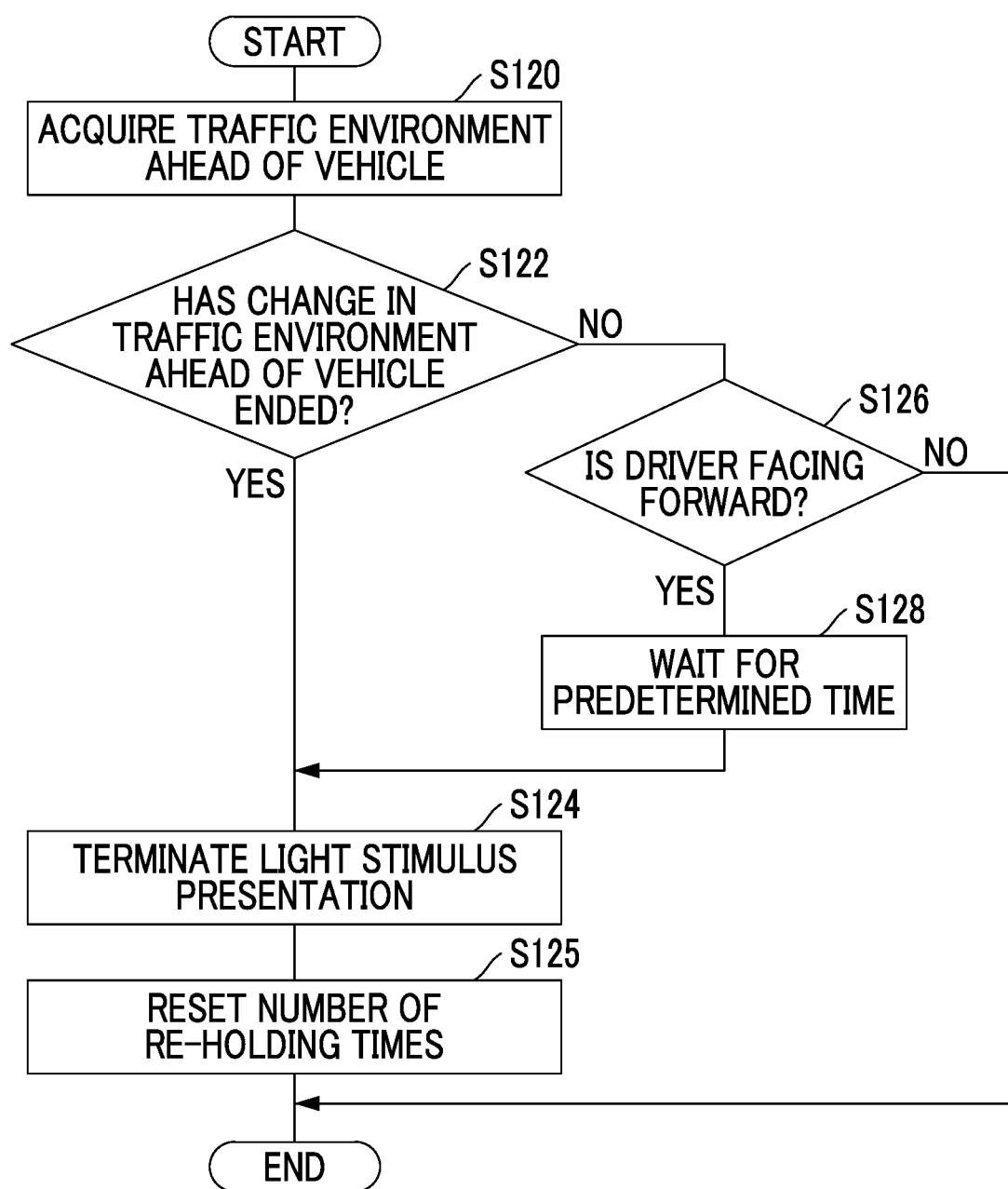
FIG. 15 is a flowchart of light stimulus presentation termination processing and count reset processing.

The number of re-holding times, which is the number of re-holding times while a light stimulus is being presented, is reset when the presentation of the light stimulus is finished. To help understand this process, the light stimulus presentation termination processing and the count resetting processing will be described below. FIG. 15 is a flowchart showing the light stimulus presentation termination processing and the count resetting processing. The flowchart shown in FIG. 15 is performed by the ECU 10, for example, after the presentation of a light stimulus.

The traffic environment acquisition processing (S120), the termination determination processing (S122), the light stimulus presentation termination processing (S124), the face orientation determination processing (S126), and the waiting processing (S128) correspond respectively to the traffic environment acquisition processing (S20), the termination determination processing (S22), the light stimulus presentation termination processing (S24), the face orientation determination processing (S26), and the waiting processing (S28) shown in FIG. 7.

If the traffic environment change has ended, the warning control unit 106 C of the ECU 10 performs the light stimulus presentation termination processing (S124) to terminate the presentation of a light stimulus. After that, the warning control unit 106C of the ECU 10 performs the resetting processing (S125) to reset the number of re-holding times stored in the storage unit. After that, the ECU 10 terminates the flowchart shown in FIG. 15. The other processing is the same as that in the flowchart shown in FIG. 7.

As described above, the presentation of a light stimulus is terminated when the change in the traffic environment ahead of the vehicle 2 has ended or when the driver is facing forward. In addition, the number of re-holding times is reset when the presentation of a light stimulus is terminated.

[Second Warning Termination Processing, Counting Processing, and Emergency Processing]

Figure 16:
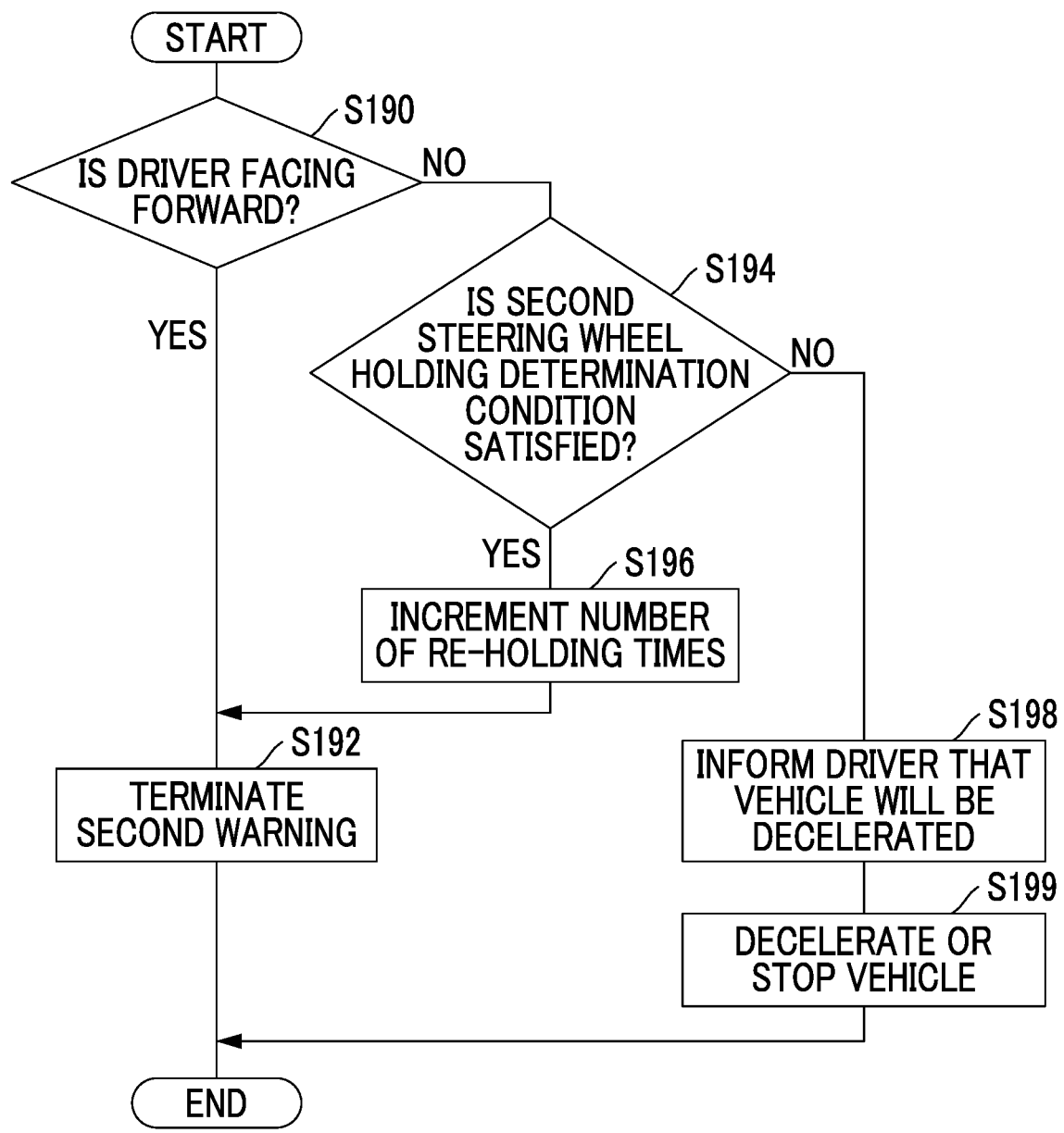
FIG. 16 is a flowchart of second warning termination processing, counting processing, and emergency processing.

Next, the second warning termination processing, counting processing, and emergency processing will be described. FIG. 16 is a flowchart showing the second warning termination processing, counting processing, and emergency processing. The flowchart shown in FIG. 16 is performed by the ECU 10, for example, after the start of the second warning.

The face orientation determination processing (S190), the warning termination processing (S192), and the second steering wheel holding determination processing (S194) correspond respectively to the face orientation determination processing (S90), the warning termination processing (S92) and the second steering wheel holding determination processing (S96) shown in FIG. 13.

If it is determined in the second steering wheel holding determination processing (S194) that the driver is holding the steering wheel, the warning control unit 106C performs the counting processing (S196) to increment the count value stored in the storage unit. After that, the warning control unit 106C performs the warning termination processing (S192) to cause the warning unit 20 to terminate the second warning. The subsequent processing is the same as that described above.

On the other hand, if it is determined in the second steering wheel holding determination processing (S194) that the driver is not holding the steering wheel, the ECU 10 performs the deceleration notification processing (S198) to notify the driver that the vehicle 2 will be emergency decelerated or emergency stopped. After that, the vehicle control unit 109 performs the deceleration/stop processing (S199) to decelerate or stop the vehicle 2. Then, the ECU 10 terminates the flowchart shown in FIG. 16. The ECU 10 does not repeatedly perform the flowchart shown in FIG. 16.
[Autonomous Driving Termination Processing]

Figure 17:
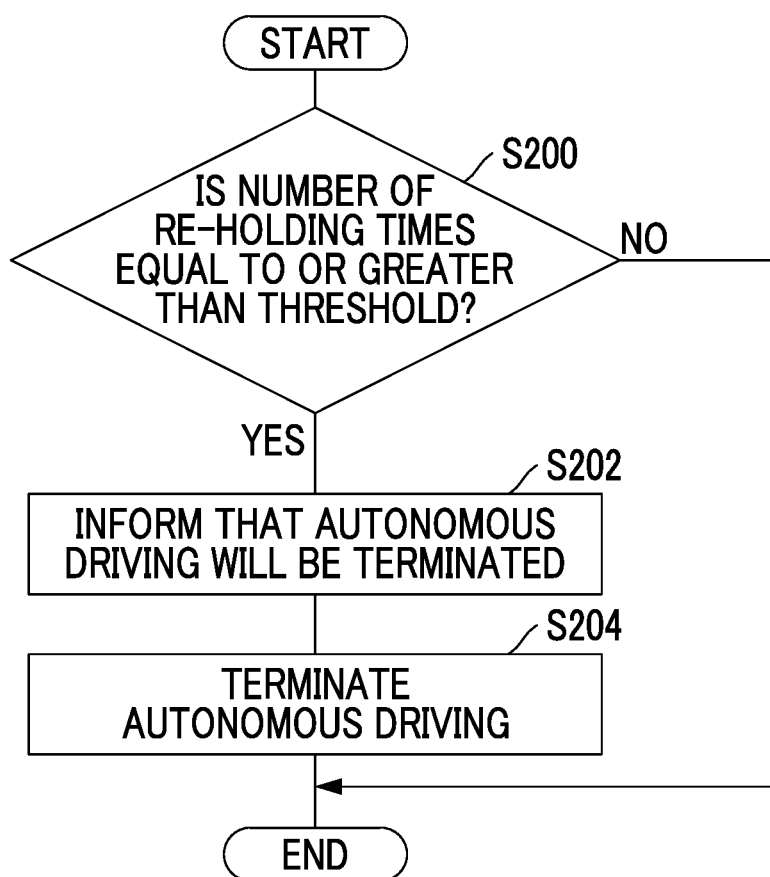
FIG. 17 is a flowchart of autonomous driving termination processing.

FIG. 17 is a flowchart showing the autonomous driving termination processing. The flowchart shown in FIG. 17 is performed by the ECU 10, for example, while a light stimulus is being presented.

The vehicle control unit 109 of the vehicle system 1C performs the number-of-times determination processing (S200) to determine whether the number of re-holding times is equal to or greater than the threshold. If it is determined in the number-of-times determination processing (S200) that the number of re-holding times is equal to or greater than the threshold, the vehicle control unit 109 performs the notification processing (S202) to notify in advance that autonomous driving will be terminated. After that, the vehicle control unit 109 performs the autonomous driving termination processing (S204) to output the signal to the autonomous driving ECU 3 for terminating the autonomous driving of the vehicle 2. The autonomous driving ECU 3 terminates the autonomous driving of the vehicle 2.

If it is determined in the number-of-times determination processing (S200) that the number of re-holding times is not equal to or greater than the threshold or if the autonomous driving, termination processing (S204) is terminated, the ECU 10 terminates the flowchart shown in FIG. 17. If a light stimulus is being presented and if the autonomous driving termination processing (S204) is not performed, the ECU 10 repeatedly performs the flowchart shown in FIG. 17.

[Effect of the Vehicle System 1C]

In the vehicle system 1C, if the number of re-holding times is equal to or greater than the threshold while a light stimulus is being presented, the vehicle control unit 109 outputs the signal to the autonomous driving ECU 3 of the vehicle 2 to terminate the autonomous driving of the vehicle 2. In this way, for a driver who has a tendency not to pay attention to driving, the vehicle system 1C can terminate the autonomous driving of the vehicle 2, thus forcing the driver to drive the vehicle himself or herself.

In addition, if it is determined by the second determination unit 108 that the driver does not hold the steering wheel before a predetermined time elapses after the second warning is started, the vehicle system IC can decelerate or stop the vehicle 2, thus ensuring traveling safety.

The above-described embodiments can be implemented by adding various changes and improvements based on the knowledge of those skilled in the art. For example, the embodiments may be combined.

Example of Configuration Modifications

A monocular camera may be used instead of the stereo camera 4. The stereo camera 4 may be provided to capture the left and right sides of the vehicle 2. The radar sensor 5 may be provided to detect an obstacle on the left and right sides of the vehicle 2. A plurality of driver monitor cameras 6 may be provided for capturing the driver Dr from a plurality of directions.

The ECU 10 may be configured by a plurality of electronic control units, A part of the functions of the ECU 10 may be executed by a computer of facilities, such as an information management center capable of communicating with the vehicle 2 or may be executed by a portable information terminal capable of communicating with the vehicle 2.

The display projection unit 201 can use a configuration known as the configuration of a head-up display. The display projection unit 201 may be any device that projects onto the display area fixed in the front part of the vehicle. For example, the display projection unit 201 may be an embedded head-up display embedded in dashboard of the vehicle 2.

The vehicle 2 does not have to include the autonomous driving ECU 3. In the above embodiments, the vehicle 2 has the function to drive autonomously. However, the present disclosure may be applied not only to a vehicle that can drive autonomously. For example, the above-described embodiments may be applied also to a vehicle that does not have the autonomous driving function.

[Modification of Processing]

In the fourth embodiment, the counting processing, the resetting processing, and the autonomous driving termination processing may be omitted. That is, the vehicle system 1C may perform only the emergency processing.

What is claimed is:

1. A vehicle system comprising:
    a warning device including
        at least one of a vibration generation device configured to generate a vibration and a sound output device configured to output a sound, and
        a display projection device configured to project a display on a display area of a head-up display provided in a vehicle; and
    at least one electronic control unit configured to
        present a light stimulus to a driver of the vehicle by using the head-up display when a change in a traffic environment is detected ahead of the vehicle, while the vehicle is performing autonomous driving,
        determine whether the driver is facing forward,
        determine whether the driver holds a steering wheel, and
        cause the warning device to
            perform a first warning, when it is determined that the driver is not facing forward while the light stimulus is being presented, the first warning being either the vibration generated by the vibration generation device or the sound output by the sound output device, and
            perform a second warning, when it is determined that the driver does not hold the steering wheel before a first predetermined time elapses after the first warning is started, the second warning including the vibration generated by the vibration generation device and the sound output by the sound output device.

2. The vehicle system according to claim 1, wherein the at least one electronic control unit is configured to
    increment a number of re-holding times, when it is determined that the driver faces forward before a second predetermined time elapses after the second warning is started or when it is determined that the driver holds the steering wheel before the second predetermined time elapses after the second warning is started, and
    output a signal for terminating the autonomous driving of the vehicle to an autonomous driving electronic control unit, when number of re-holding times while the light stimulus is being presented, is equal to or greater than a threshold, the autonomous driving electronic control unit being provided in the vehicle and being configured to perform the autonomous driving of the vehicle.

3. The vehicle system according to claim 2, wherein
the at least one electronic control unit is configured to decelerate the vehicle or stop the vehicle when it is determined that the driver does not hold the steering wheel before the second predetermined time elapses after the second warning is started.

4. The vehicle system according to claim 1, wherein
the at least one electronic control unit is configured to decelerate the vehicle or to stop the vehicle when it is determined that the driver does not hold the steering wheel before a second predetermined time elapses after the second warning is started.

5. The vehicle system according to claim 1, further comprising
a driver monitor camera, wherein
the at least one electronic control unit is configured to detect whether the driver is facing forward by using the driver monitor camera.

6. The vehicle system according to claim 1, wherein
the second warning has a stimulus intensity higher than the stimulus intensity of the first warning.

7. The vehicle system according to claim 1, wherein the vibration generation device includes a weight and motor configured to rotate the weight to generate the vibration, and wherein the sound output device includes a speaker configured to output the sound.

8. A vehicle comprising:
a sensor configured to detect a change in a traffic environment ahead of the vehicle;
a head-up display including a display projection device, the display projection device being configured to present a light stimulus to a driver of the vehicle by projecting a display on a display area of the head-up display based on a detection result of the sensor;
a warning device including at least one of a vibration generation device and a sound output device, the warning device configured to output at least one of a vibration generated by the vibration generation device and a sound output by the sound output device; and
at least one electronic control unit configured to
cause the display projection device to present the light stimulus,
determine whether the driver is facing forward,
cause the warning device to perform a first warning when it is determined that the driver is not facing forward while the light stimulus is being presented,
determine whether the driver holds a steering wheel, and
cause the warning device to perform a second warning, when it is determined that the driver does not hold the steering wheel before a first predetermined time elapses after the first warning is started, cause the warning device to perform a second warning, when it is determined that the driver does not hold the steering wheel before a first predetermined time elapses after the first warning is started, wherein the second warning:
has a stimulus intensity higher than the stimulus intensity of the first warning, or
is performed to stimulate a number of senses of the driver greater than a number of senses that the first warning is performed to stimulate.

9. The vehicle according to claim 8, further comprising
an autonomous driving electronic control unit configured to perform autonomous driving of the vehicle, wherein
the at least one electronic control unit is configured to
cause the autonomous driving electronic control unit to perform the autonomous driving of the vehicle,
increment the number of re-holding times when it is determined that the driver faces forward before a second predetermined time elapses after the second warning is started or when it is determined that the driver holds the steering wheel before the second predetermined time elapses after the second warning is started, and
output a signal for terminating the autonomous driving of the vehicle to the autonomous driving electronic control unit when the number of re-holding times is equal to or greater than a threshold.

10. The vehicle according to claim 8, wherein
the at least one electronic control unit is configured to decelerate the vehicle or to stop the vehicle when it is determined that the driver does not hold the steering wheel before a second predetermined time elapses after the second warning is started.

11. The vehicle according to claim 8, wherein the senses of the driver include a visual sense and a non-visual sense.

12. The vehicle according to claim 8, wherein the vibration generation device includes a weight and motor configured to rotate the weight to generate the vibration, and wherein the sound output device includes a speaker configured to output the sound.

* * * * *